(12) United States Patent
Shoen et al.

(10) Patent No.: US 11,745,808 B2
(45) Date of Patent: Sep. 5, 2023

(54) WORK VEHICLE

(71) Applicant: KUBOTA CORPORATION, Osaka (JP)

(72) Inventors: Shigeo Shoen, Sakai (JP); Maho Yamanaka, Sakai (JP); Yukari Fujii, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 180 days.

(21) Appl. No.: 17/352,481

(22) Filed: Jun. 21, 2021

(65) Prior Publication Data

US 2021/0403098 A1  Dec. 30, 2021

(30) Foreign Application Priority Data

Jun. 25, 2020  (JP) ................................ 2020-109568

(51) Int. Cl.
| | | |
|---|---|---|
| *B60K 17/00* | (2006.01) | |
| *B60N 2/38* | (2006.01) | |
| *B62D 33/06* | (2006.01) | |
| *B60N 3/04* | (2006.01) | |
| *F16H 57/04* | (2010.01) | |

(52) U.S. Cl.
CPC .......... *B62D 33/0621* (2013.01); *B60K 17/00* (2013.01); *B60N 2/38* (2013.01); *B60N 3/048* (2013.01); *F16H 57/0424* (2013.01)

(58) Field of Classification Search
CPC .......... B60K 17/00; B60N 2/38; B60N 3/048; B60N 3/046; B62D 25/20
USPC .......................................... 296/193.07, 97.23
See application file for complete search history.

(56) References Cited

U.S. PATENT DOCUMENTS

| | | | |
|---|---|---|---|
| 3,450,429 A | * | 6/1969 | Stata .................. B60N 3/044 296/97.23 |
| 11,230,212 B2 | * | 1/2022 | Ichihara .............. B60N 3/048 |
| 2004/0187409 A1 | * | 9/2004 | Kojima .................. E02F 9/16 52/220.1 |

(Continued)

FOREIGN PATENT DOCUMENTS

| | | | |
|---|---|---|---|
| DE | 10 2012 100 358 A1 | 7/2013 | |
| DE | 102012100358 A1 | * 7/2013 | ............. B60N 3/048 |
| JP | 55-052438 U | 4/1980 | |

(Continued)

OTHER PUBLICATIONS

Official Communication issued in corresponding European Patent Application No. 21181508.9, dated Jan. 28, 2022.

*Primary Examiner* — Amy R Weisberg
*Assistant Examiner* — Sara Laghlam
(74) *Attorney, Agent, or Firm* — KEATING AND BENNETT, LLP

(57) ABSTRACT

A work vehicle includes a transmission case including an injection port to allow injection of transmission oil, a floor mat above the transmission case and near a driver's seat, the floor mat including an opening/closing portion to be opened in an open state in which the injection port is exposed and to be closed in a closed state in which the injection port is covered, and a fixing portion to fix the opening/closing portion in the closed state, in which the opening/closing portion includes a protrusion protruding in a predetermined direction, and the fixing portion includes a hole configured to fix the opening/closing portion when the protrusion is inserted into the hole.

20 Claims, 16 Drawing Sheets

(56) References Cited

U.S. PATENT DOCUMENTS

| | | | |
|---|---|---|---|
| 2015/0176248 A1* | 6/2015 | Horikawa | B60N 3/048 296/97.23 |
| 2015/0217666 A1* | 8/2015 | Garbarino | B60N 3/044 428/100 |

FOREIGN PATENT DOCUMENTS

| | | |
|---|---|---|
| JP | 61-141147 U | 9/1986 |
| JP | 2001-287583 A | 10/2001 |
| JP | 2010-264819 A | 11/2010 |
| JP | 2013-252785 A | 12/2013 |

* cited by examiner

WORK VEHICLE

CROSS REFERENCE TO RELATED APPLICATIONS

This application claims the benefit of priority to Japanese Patent Application No. 2020-109568 filed on Jun. 25, 2020. The entire contents of this application are hereby incorporated herein by reference.

BACKGROUND OF THE INVENTION

1. Field of the Invention

The present disclosure relates to a technique of a work vehicle.

2. Description of the Related

A technique of a work vehicle such as a tractor having a floor mat has been known. The technique is disclosed in, for example, JP 2010-264819 A.

JP 2010-264819 A discloses an agricultural tractor in which a floor mat is laid on a step of a driver's seat.

The floor mat as described above is disposed above a mission case. In some of such tractors, the floor mat has to be rolled up to expose an injection port when transmission oil is to be injected into the mission case.

In such a floor mat, in order to make it easier to expose the injection port, it is conceivable to provide an opening/closing portion in which an appropriate cut or the like is made in the floor mat such that a portion of the floor mat can be easily rolled up.

However, when the opening/closing portion as described above is provided, it is conceivable that the opening/closing portion is unintentionally opened, resulting in poor appearance and clogging of a gap with dust or the like.

SUMMARY OF THE INVENTION

Preferred embodiments of the present invention provide work vehicles each capable of preventing an opening/closing portion from unintentionally opening.

That is, a work vehicle according to a preferred embodiment of the present invention includes a mission case provided with an opening that allows for injection of transmission oil, a floor mat located above the mission case and near a driver's seat, the floor mat including an opening/closing portion to be opened in an open state in which the opening is exposed and to be closed in a closed state in which the opening is covered, and a fixing portion configured to fix the opening/closing portion in the closed state, in which the opening/closing portion includes a protrusion protruding in a predetermined direction, and the fixing portion includes a hole configured to fix the opening/closing portion when the protrusion is inserted into the hole.

In a work vehicle according to a preferred embodiment of the present invention, the opening/closing portion is between a pair of slits extending from a first end in a front-rear direction of the floor mat to a second end in the front-rear direction of the floor mat.

In a work vehicle according to a preferred embodiment of the present invention, the floor mat includes a groove facilitating transformation of the floor mat due to opening and closing of the opening/closing portion.

In a work vehicle according to a preferred embodiment of the present invention, the driver's seat includes a seat base provided with a seat, and the opening/closing portion is provided at a position adjacent to the seat base in front of the seat base.

In a work vehicle according to a preferred embodiment of the present invention, the fixing portion is provided on the seat base.

In a work vehicle according to a preferred embodiment of the present invention, the hole allows injection of the mission oil therethrough.

In a work vehicle according to a preferred embodiment of the present invention, the opening/closing portion includes a handle protruding upward from an upper surface of the opening/closing portion.

In a work vehicle according to a preferred embodiment of the present invention, the floor mat includes a holder to hold the opening/closing portion in the open state.

In a work vehicle according to a preferred embodiment of the present invention, the opening/closing portion includes a handle protruding upward from an upper surface of the opening/closing portion, and the holder includes a receiver to hold the opening/closing portion by receiving the handle.

The following effects are exhibited by one or more preferred embodiments of the present disclosure.

In a work vehicle according to a preferred embodiment of the present invention, the opening/closing portion can be prevented from opening unintentionally.

In a work vehicle according to a preferred embodiment of the present invention, the opening/closing portion can be opened and closed in the front-rear direction.

In a work vehicle according to a preferred embodiment of the present invention, the opening/closing portion can be easily opened and closed.

In a work vehicle according to a preferred embodiment of the present invention, the opening/closing portion can be more effectively prevented from opening unintentionally.

In a work vehicle according to a preferred embodiment of the present invention, the opening/closing portion can be fixed in the closed state using the seat base.

In a work vehicle according to a preferred embodiment of the present invention, the opening/closing portion can be fixed in the closed state by utilizing the hole used to inject the transmission oil.

In a work vehicle according to a preferred embodiment of the present invention, the opening/closing portion can be easily opened and closed by gripping the handle.

In a work vehicle according to a preferred embodiment of the present invention, the open state of the opening/closing portion can be maintained, and the transmission oil can be easily injected through the injection port.

In a work vehicle according to a preferred embodiment of the present invention, the opening/closing portion can be held in the open state by using the handle.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
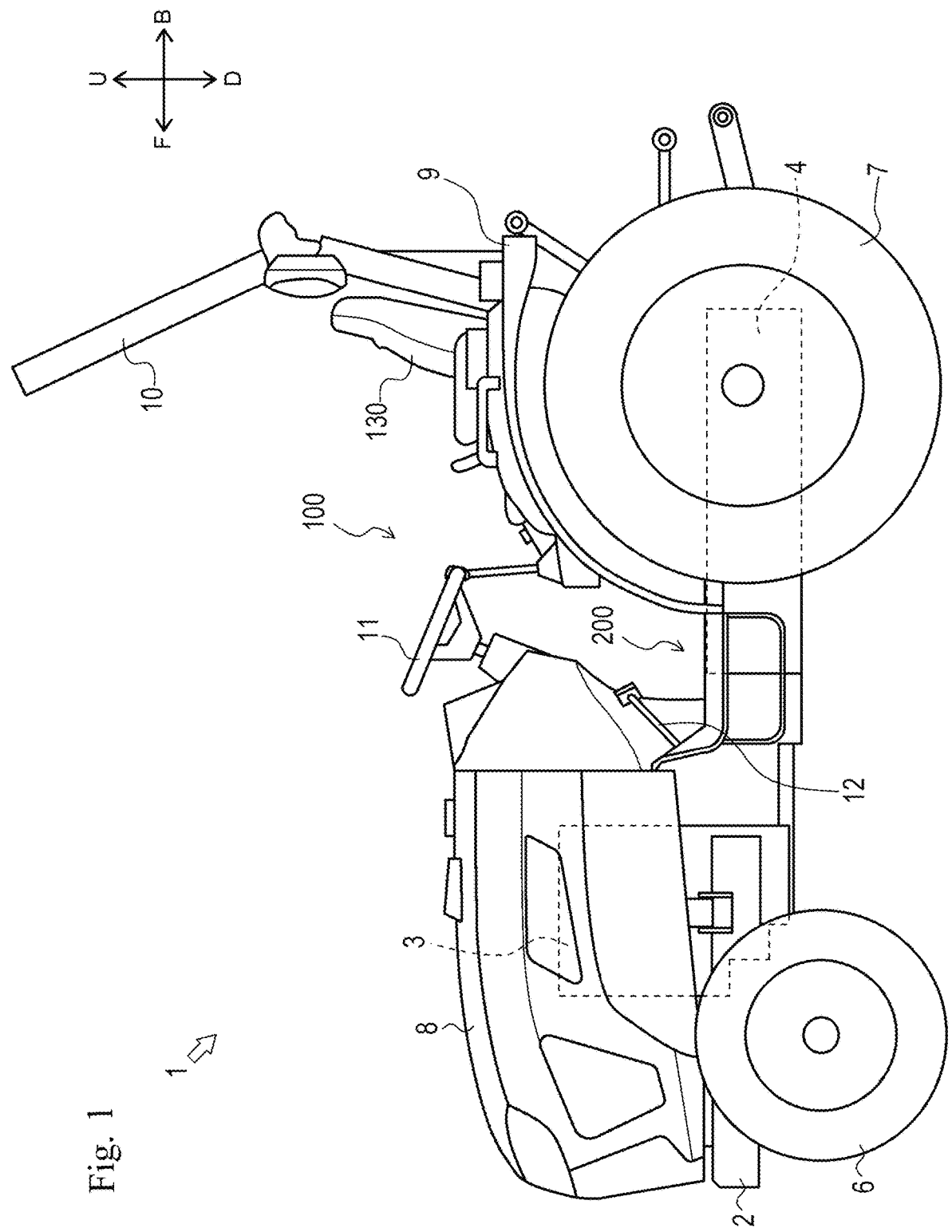
FIG. 1 is a side view of an overall configuration of a tractor according to a first preferred embodiment of the present invention.

Hereinafter, directions indicated by arrows U, D, F, B, L, and R in the drawings are defined as up, down, front, rear, left, and right, respectively, and descriptions will be made accordingly.

Hereinafter, an overall configuration of a tractor 1 according to a first preferred embodiment of the disclosure will be described with reference to FIG. 1.

The tractor 1 mainly includes a body frame 2, an engine 3, a transmission case 4, a hydraulic elevator 5, front wheels 6, rear wheels 7, a hood 8, fenders 9, a ROPS (roll over protection system) 10, a driver's seat 100, and the like.

The body frame 2 is disposed with a longitudinal direction facing in a front-rear direction. The engine 3 is fixed to a rear portion of the body frame 2. The transmission case 4 is disposed behind the engine 3. An injection port 4a into which transmission oil is injectable is at an upper portion of the transmission case 4 (see FIG. 4). The injection port 4a is provided with a cap 4b capable of closing the injection port 4a. The hydraulic elevator 5 is provided behind the transmission case 4. Various work apparatuses (for example, a rotary tillage apparatus) can be attached to the hydraulic elevator 5. Further, various work machines (for example, mower) can be attached to a lower portion of the transmission case 4 (between the front wheels 6 and the rear wheels 7).

A front portion of the body frame 2 is supported by a pair of left and right front wheels 6 through a front axle mechanism (not shown). The transmission case 4 is supported by a pair of left and right rear wheels 7 through a rear axle mechanism (not shown). The pair of left and right rear wheels 7 is covered by the fenders 9 substantially from above.

The engine 3 is covered with the hood 8. The driver's seat 100 in which a driver sits is provided behind the hood 8. Details of the driver's seat 100 will be described later. Further, the ROPS 10 protecting the driver's seat 100 is provided behind the driver's seat 100.

Power of the engine 3 can be transmitted to the front wheels 6 through the front axle mechanism after being changed by a transmission (not shown) housed in the transmission case 4, and can be transmitted to the rear wheels 7 through the rear axle mechanism. In this way, the front wheels 6 and the rear wheels 7 are driven to be rotated by the power of the engine 3, and the tractor 1 can travel.

Figure 2:
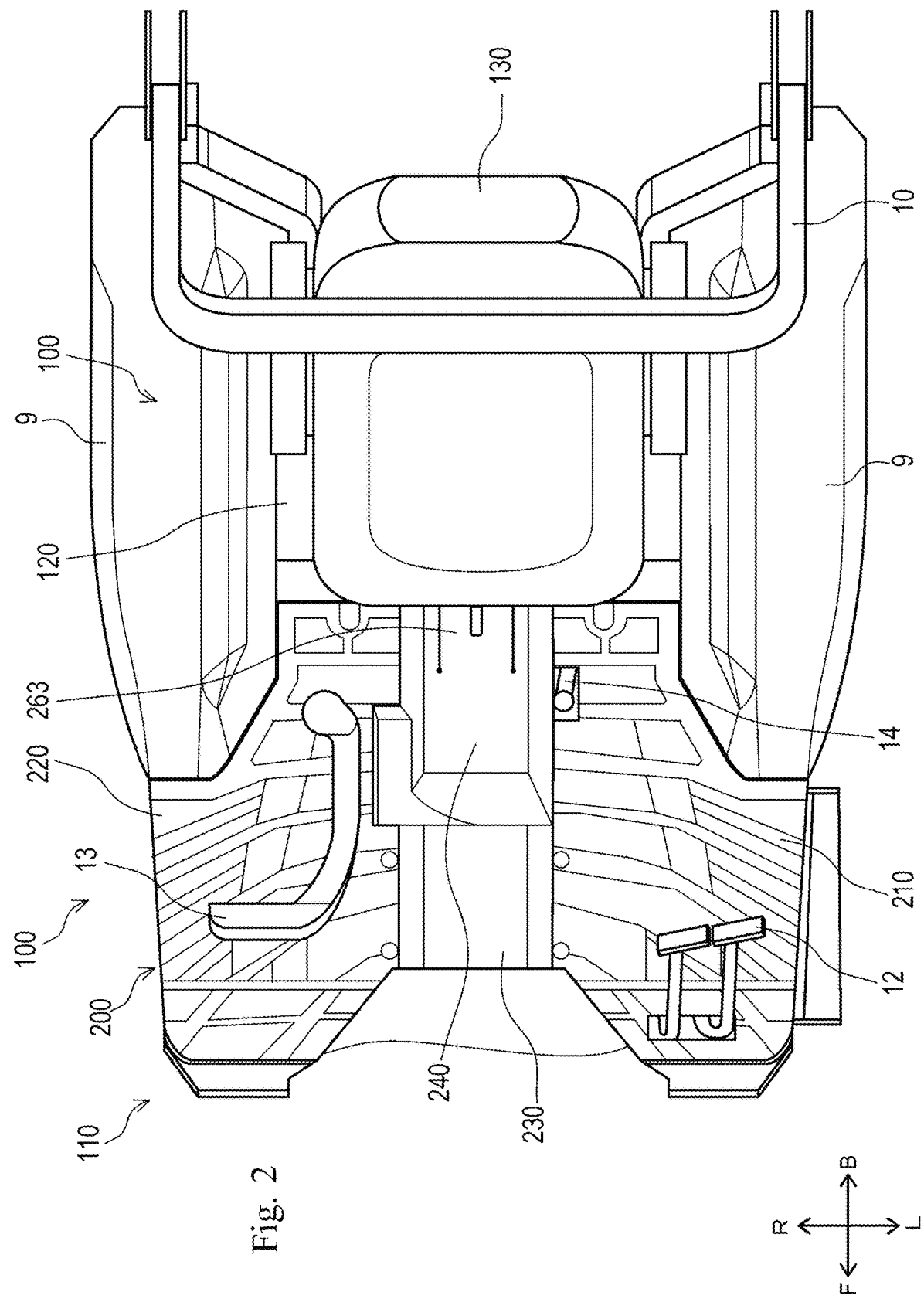
FIG. 2 is a plan view of a driver's seat.
Figure 3:
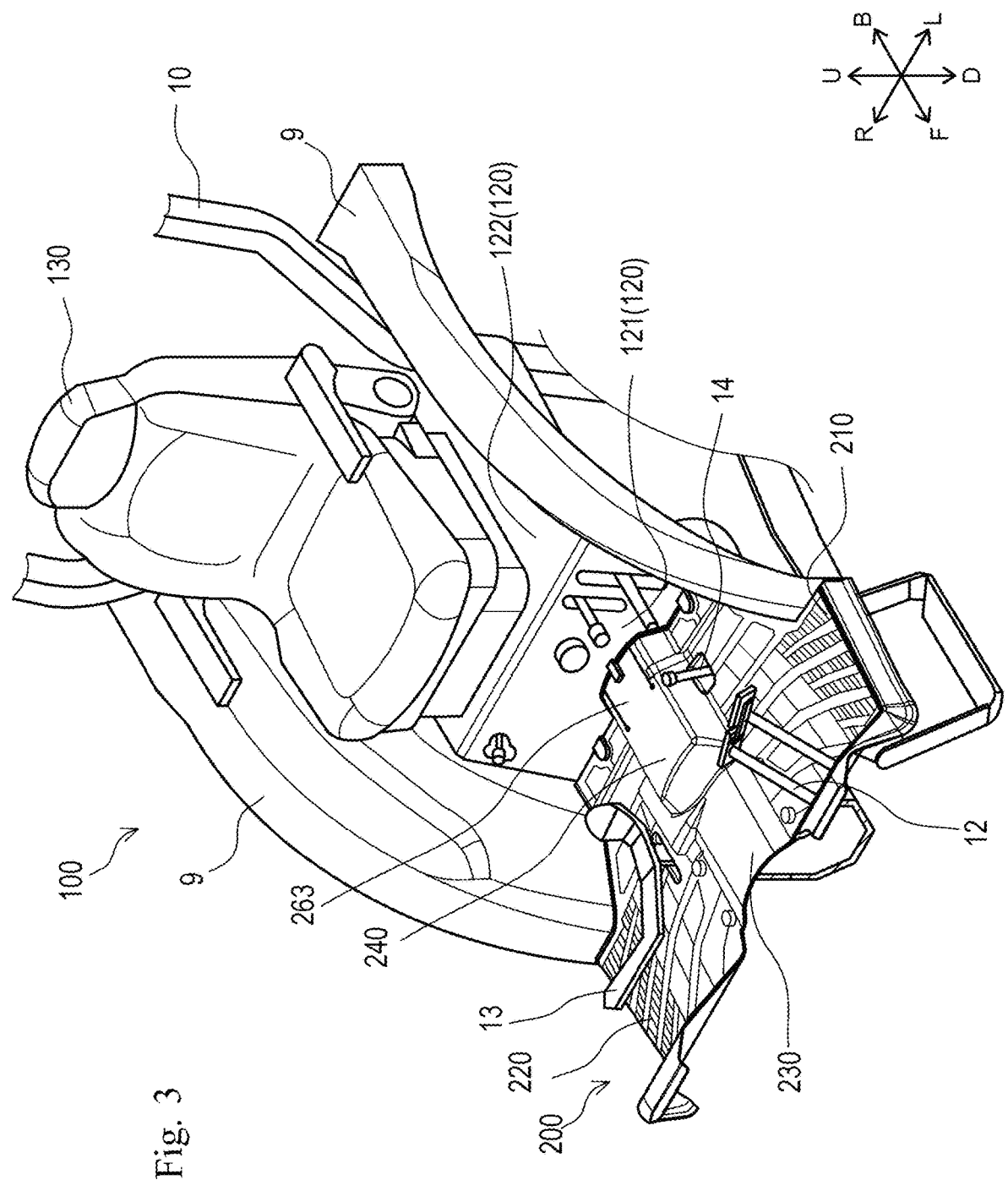
FIG. 3 is a perspective view of the driver's seat.

Next, the details of the driver's seat 100 will be described with reference to FIGS. 1 to 4. As shown in FIG. 1, a steering wheel 11 to adjust a turning angle of the front wheels 6 is disposed at a front portion of the driver's seat 100. Further, as shown in FIGS. 2 and 3, a brake pedal 12 operating a braking device (not shown) braking the rear wheels 7 and the tractor 1, a speed control pedal 13 adjusting speed and switching between forward and backward movements, and a differential lock pedal 14 locking a differential device (not shown) are disposed on a floor of the driver's seat 100 (steps 110 described later). The driver's seat 100 includes the steps 110, a seat base 120, and a seat 130.

Figure 4:
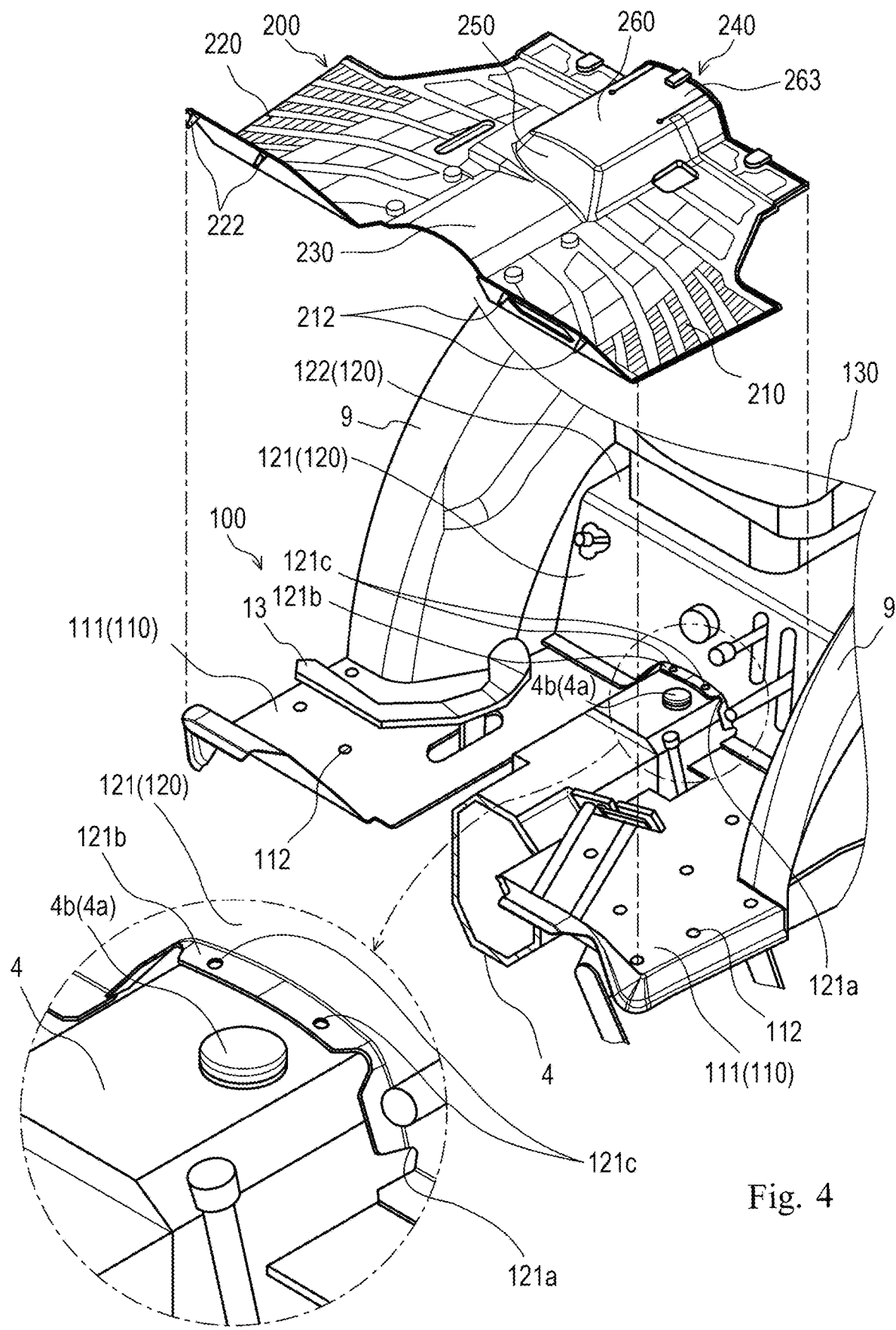
FIG. 4 is an exploded perspective view of the driver's seat.

The steps 110 shown in FIG. 4 configure the floor of the driver's seat 100. A pair of the steps 110 is located on left and right sides of the transmission case 4. Each of the steps 110 includes a main body 111 and positioning holes 112.

The main body 111 is a main structural body of each step 110. The main body 111 has a substantially plate shape with a thickness direction facing in an up-down direction. The main body 111 has a substantially rectangular shape in which a rear portion outside in a left-right direction when viewed in the thickness direction is cut out. Further, the main body 111 has a shape that is appropriately bent with a front portion inclined upward. The main body 111 is fixed to the transmission case 4 through an appropriate support member (not shown) provided on the transmission case 4. Further, each fender 9 is fixed to the rear portion of the main body 111 outside in the left-right direction.

The positioning holes 112 are where positioning protrusions 212 and 222 of a floor mat 200, which will be described later, are inserted. A plurality of the positioning holes 112 pass through the main body 111 in a thickness direction.

As shown in FIG. 4, an upper portion of the transmission case 4 is exposed between the pair of steps 110. The upper portion of the transmission case 4 is located above an upper surface (a portion excluding the front portion) of the main body 111. The upper portion of the transmission case 4 exposed between the pair of steps 110 has a rear portion protruding upward from the front portion. Further, the injection port 4a is provided in the rear portion.

Further, each step 110 is appropriately provided with an opening through which the brake pedal 12, the speed control pedal 13, and the differential lock pedal 14 are inserted.

The seat base 120 shown in FIGS. 3, 4, 8A, and 8B is where the seat 130 described later is installed. The seat base 120 is provided behind the steps 110 near the driver's seat 100. The seat base 120 is structured such that an upper surface (an upper surface of a placing portion 122 described later) is located above the upper surface of the main body 111 of each step 110. In other words, the seat base 120 is one step higher than the main body 111 of each step 110. The seat base 120 includes a front wall 121 and the placing portion 122.

The front wall 121 shown in FIG. 4 configures a front surface of the seat base 120. The front wall 121 has a substantially plate shape with the thickness direction facing the front-rear direction. The front wall 121 is disposed to be bridged over the pair of steps 110. A lower end of the front wall 121 is fixed to the rear end of the main body 111 of each step 110. The front wall 121 includes a recess 121a and a fixing portion 121b.

Figure 8A:
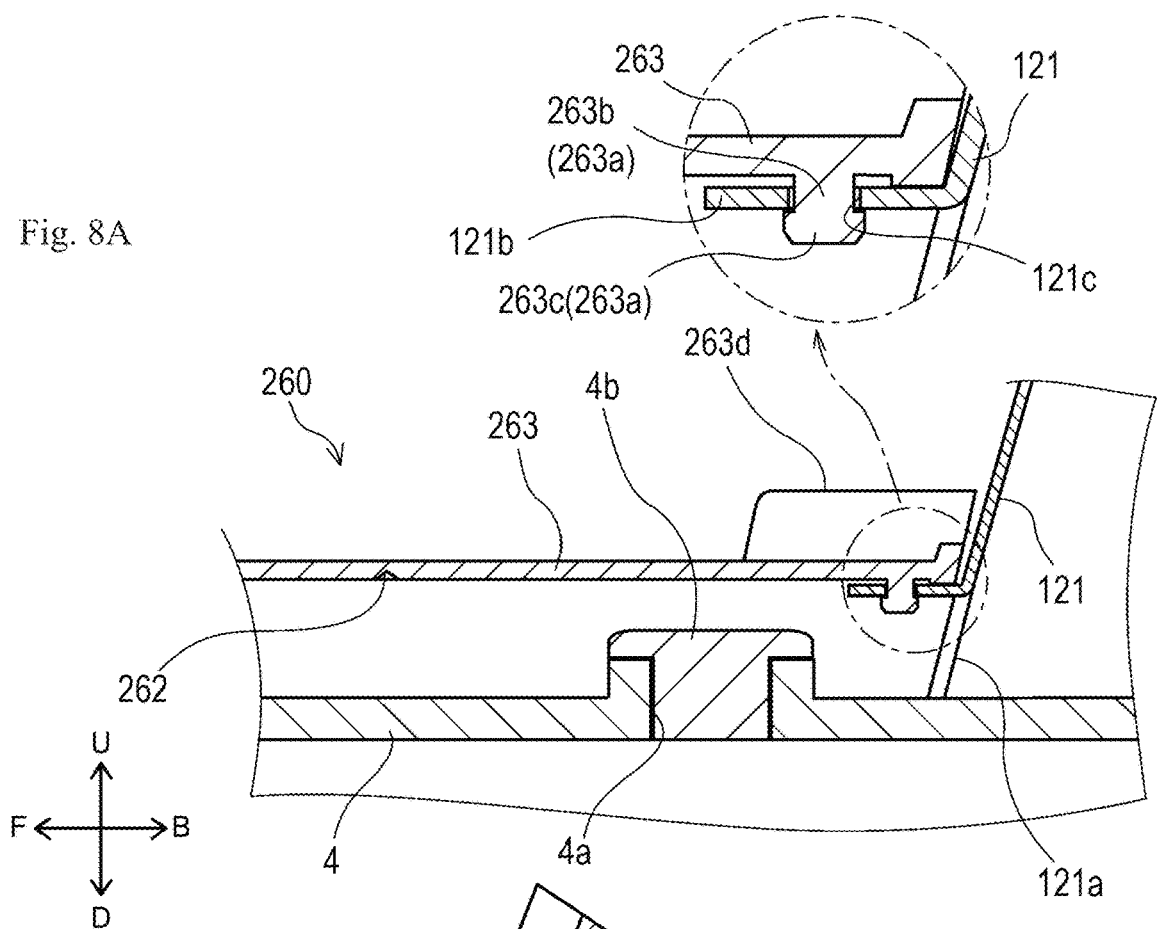
FIG. 8A is a cross-sectional view of the opening/closing portion in a closed state, taken along line X1-X1 in FIG. 7A.
Figure 8B:
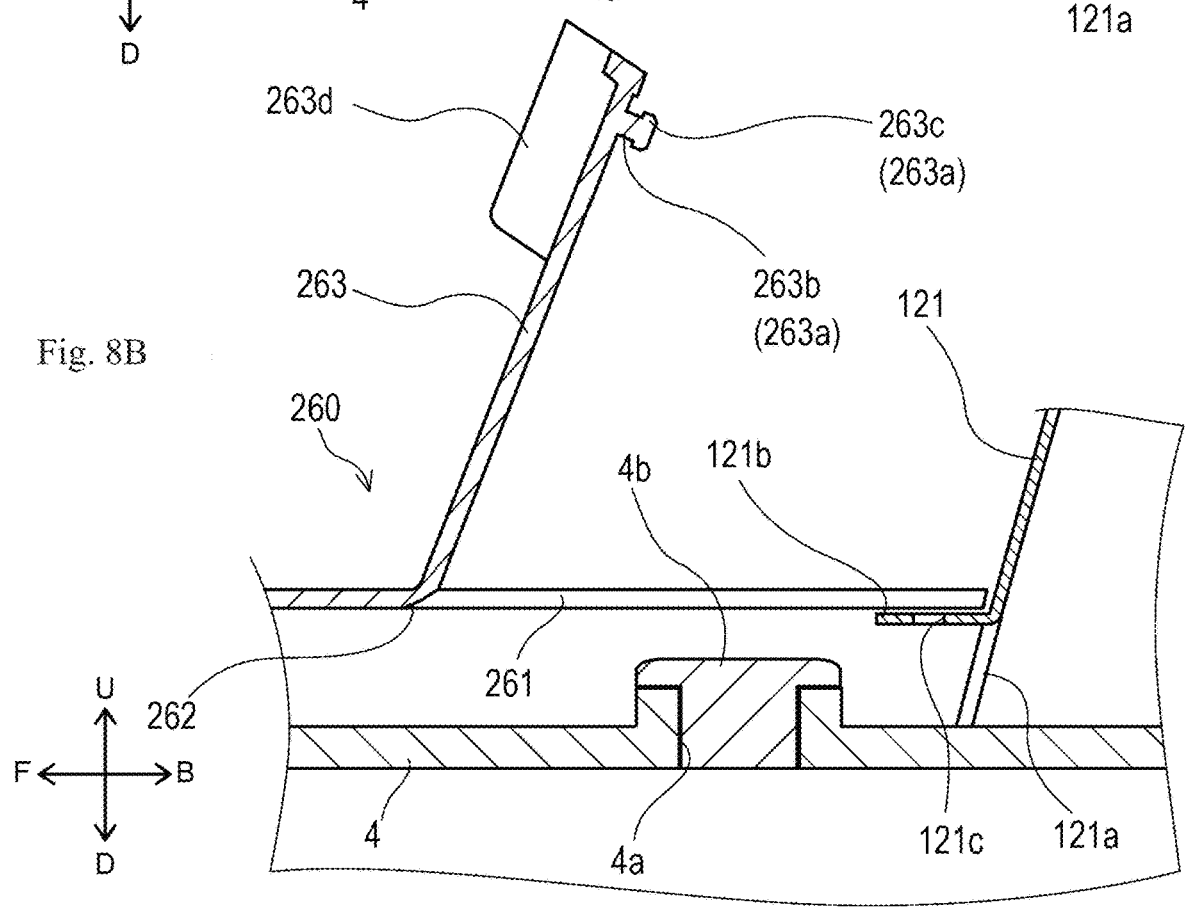
FIG. 8B is a cross-sectional view of the opening/closing portion in an open state.

The recess 121a shown in FIGS. 4, 8A, and 8B is a portion of the lower end of the front wall 121 that opens downward so as to receive the upper portion of the transmission case 4. The recess 121a is located at a central portion in the left-right direction of the lower end of the front wall 121. The recess 121a has a substantially trapezoidal shape in a front view.

The fixing portion 121b is capable of fixing an opening/closing portion 263 of the floor mat 200, which will be described later, in a closed state. The fixing portion 121b protrudes forward from an edge at an upper end of the recess 121a. The fixing portion 121b has a substantially plate shape with the thickness direction facing in the up-down direction. In the illustrated example, an example is shown in which the fixing portion 121b has a plate shape slightly curved so as to be convex upward. The fixing portion 121b has a substantially rectangular shape in a plan view. The fixing portion 121b extends over the entire left-right direction of the edge at the upper end (a portion configuring an upper bottom of the trapezoid) of the recess 121a. The fixing portion 121b includes a hole 121c.

The hole 121c is where a protrusion 263a of the floor mat 200, which will be described later, is inserted. The hole 121c passes through the fixing portion 121b in the thickness direction. A pair of the holes 121c is provided with a space in the left-right direction.

The placing portion 122 configures the upper surface of the seat base 120. The placing portion 122 extends rearward from an upper end of the front wall 121. Left and right ends of the placing portion 122 are fixed to the left and right fenders 9 by appropriate fasteners.

The seat 130 shown in FIGS. 2 and 3 is for a driver to sit on. The seat 130 is fixed to the upper surface of the placing portion 122 of the seat base 120.

The floor mat 200 shown in FIGS. 4 to 7B is laid on the steps 110 near the driver's seat 100. The floor mat 200 is disposed above the steps 110 and the transmission case 4. Further, the floor mat 200 is disposed in front of the seat base 120. The floor mat 200 includes a flexible material such as a synthetic resin material. The floor mat 200 is laid to reduce noise of the driver's seat 100. The floor mat 200 includes a left section 210, a right section 220, a front central section 230, a rear central section 240, and a rib 270.

Figure 5:
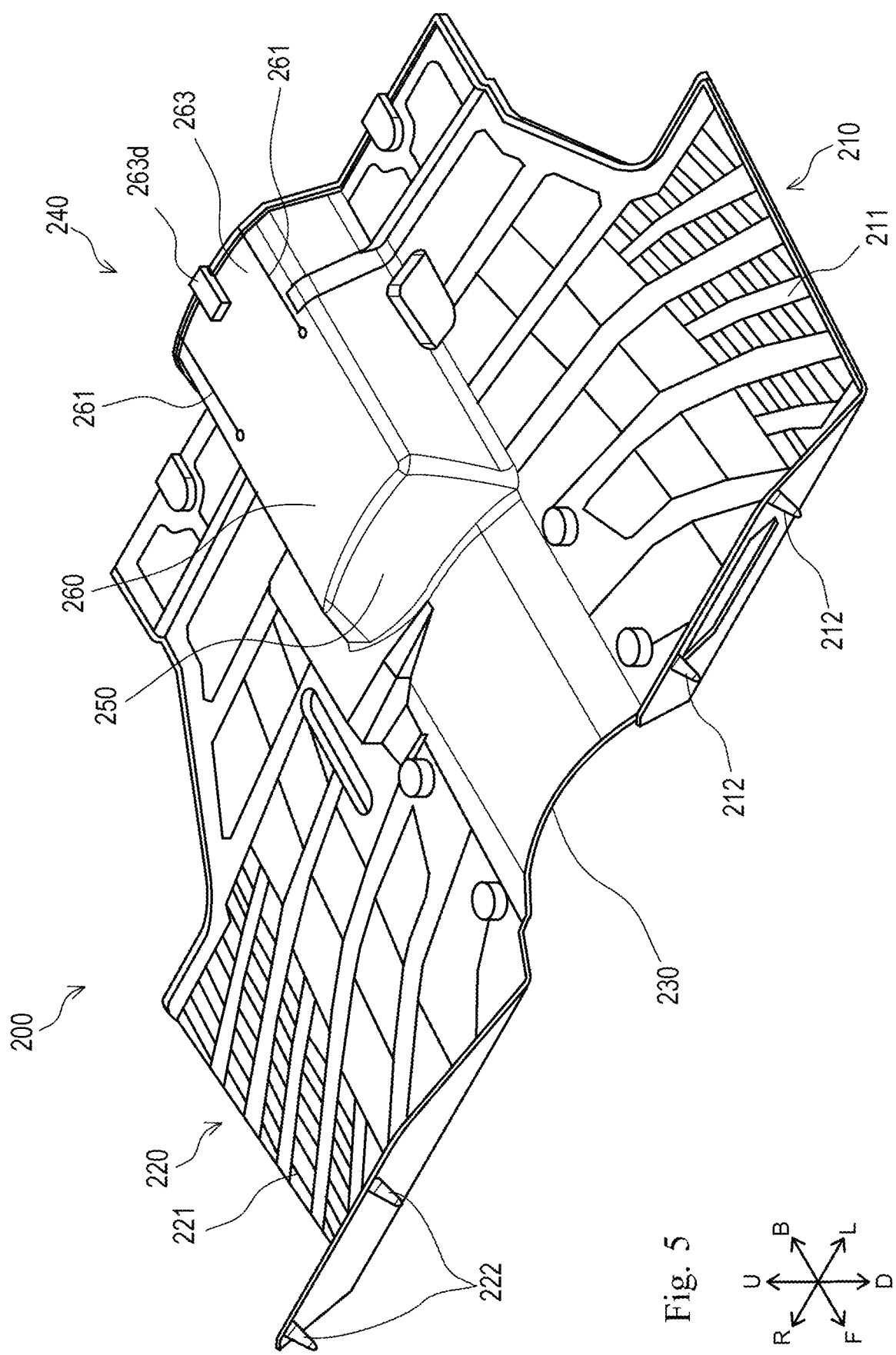
FIG. 5 is a perspective view of a floor mat.
Figure 5:
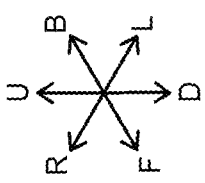

The left section 210 shown in FIG. 5 covers the step 110 on the left. The left section 210 is placed on the step 110 on the left. The left section 210 includes a main body 211 and the positioning protrusions 212.

The main body 211 is a main structural body of the left section 210. The main body 211 has a substantially plate shape with the thickness direction facing in the up-down direction. The main body 211 has substantially the same shape as the step 110 (main body 111) on the left in a plan view. That is, the main body 211 has a substantially rectangular shape with a left rear portion cut out in a plan view. Further, the main body 211 has an appropriately bent shape with the front portion is inclined upward. Further, the main body 211 is appropriately provided with an opening into which the brake pedal 12 and the differential lock pedal 14 are inserted.

The positioning protrusions 212 are capable of positioning with respect to the step 110 on the left. The positioning protrusion 212 protrudes from a lower surface of the left section 210. The positioning protrusions 212 are inserted into the positioning holes 112 in the step 110 on the left. The positioning protrusions 212 are provided at a plurality of positions of the main body 211 so as to correspond to the positioning holes 112.

The right section 220 covers the step 110 on the right. The right section 220 is placed on the step 110 on the right. The right section 220 includes a main body 221 and the positioning protrusions 222.

The main body 221 is a main structural body of the right section 220. The main body 221 has a shape obtained by horizontally reversing the main body 211 of the left section 210. Further, the main body 221 is appropriately provided with an opening through which the speed control pedal 13 is inserted.

The positioning protrusions 222 are capable of positioning with respect to the step 110 on the right. The positioning protrusions 222 protrude from a lower surface of the right section 220. The positioning protrusions 222 are inserted into the positioning holes 112 in the step 110 on the right. The positioning protrusions 222 are provided at a plurality of positions of the main body 221 so as to correspond to the positioning holes 112.

The front central section 230 shown in FIG. 5 covers a front portion (front portion of the opening between the pair of steps 110) of a central portion of the steps 110 in the left-right direction. The front central section 230 is provided between the left section 210 and the right section 220. The front central section 230 covers the front portion of the transmission case 4 between the pair of steps 110. The front central section 230 has a substantially rectangular shape in a plan view. Further, as shown in FIG. 5, the front central section 230 has a shape capable of accepting the upper front portion of the transmission case 4. Specifically, the front central section 230 has a substantially plate shape that is curved to be convex upward.

Figure 6:
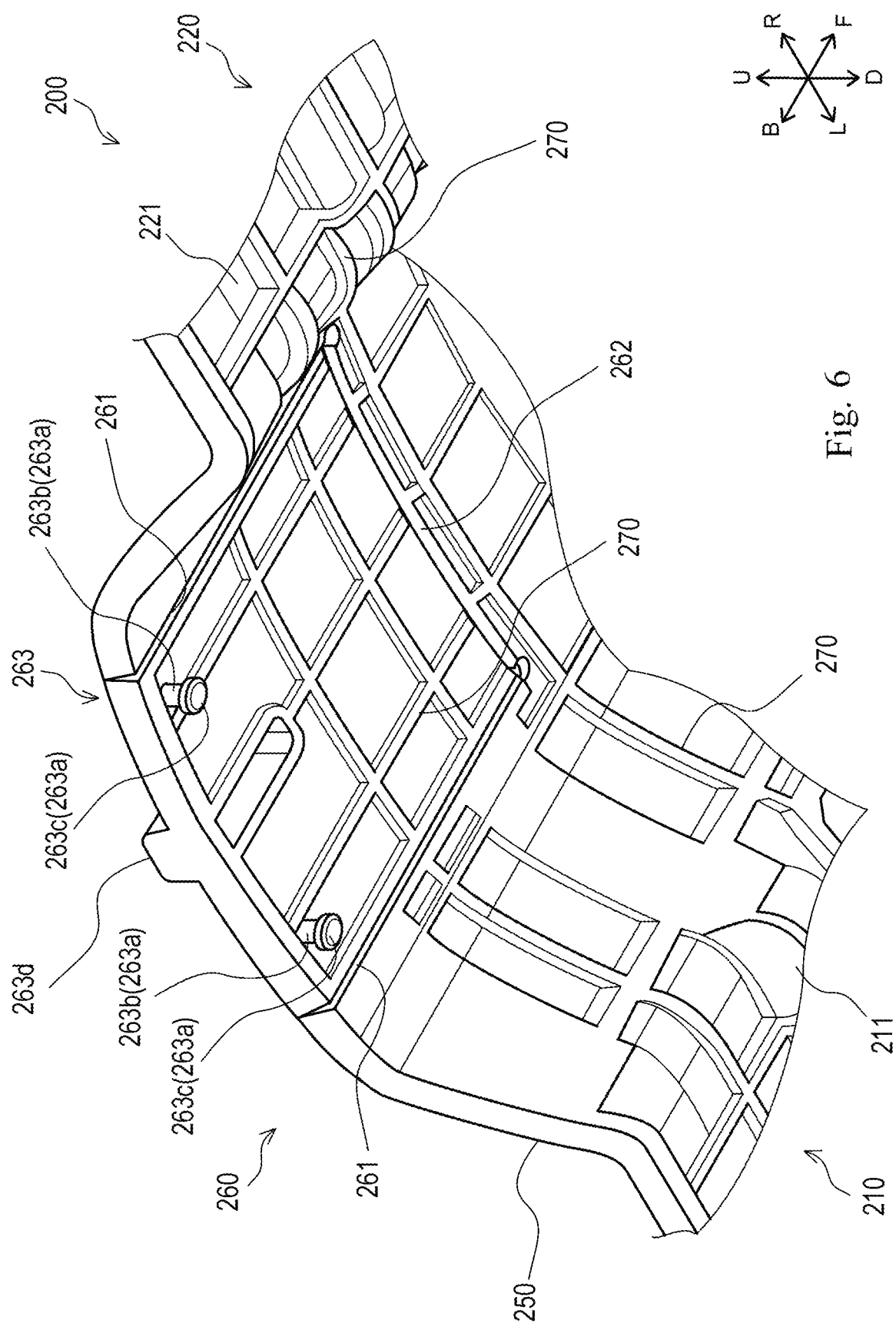
FIG. 6 is a perspective view of an opening/closing portion when viewed from below.

The rear central section 240 shown in FIG. 5 covers a rear portion (rear portion of the opening between the pair of steps 110) of the central portion of the steps 110 in the left-right direction. The rear central section 240 is provided between the left section 210 and the right section 220. The rear central section 240 covers the rear portion of the transmission case 4 between the pair of steps 110. As shown in FIGS. 5 and 6, the rear central section 240 has a shape capable of accepting the upper rear portion of the transmission case 4. Specifically, the rear central section 240 has a substantially box shape that opens downward and rearward. The rear central section 240 includes a side wall 250 and an upper wall 260.

The side wall 250 configures a side wall in the rear central section 240. The side wall 250 includes a front wall that rises upward from the front central section 230, and left and right side walls that rise upward from the left section 210 and the right section 220. The side wall 250 has a substantially plate shape having the same thickness as the left section 210, the right section 220, and the front central section 230.

The upper wall 260 shown in FIGS. 5 to 7B configures an upper wall in the rear central section 240. The upper wall 260 has a substantially rectangular shape in a plan view. The upper wall 260 has a substantially plate shape having the same thickness as the side wall 250. The upper wall 260 includes slits 261, a groove 262, and the opening/closing portion 263.

Figure 7A:
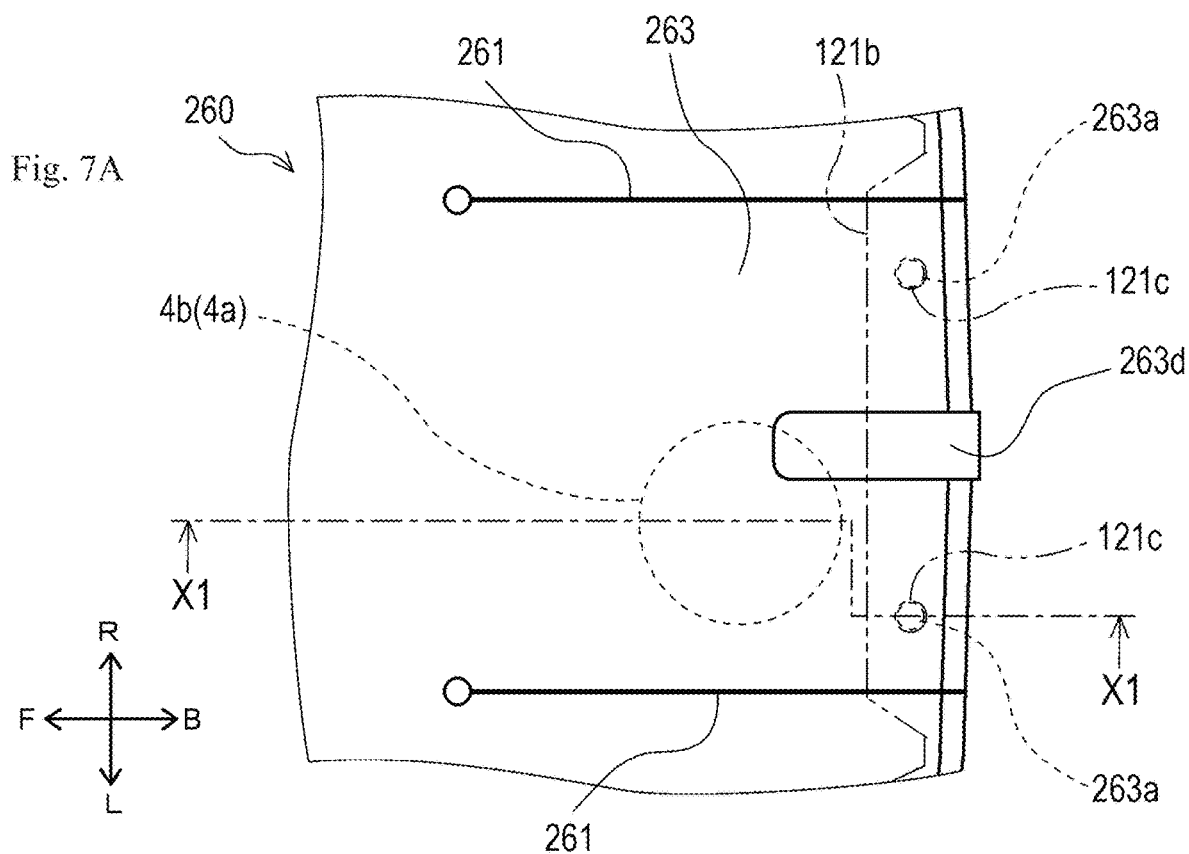
FIG. 7A is a plan view of the opening/closing portion.
Figure 7B:
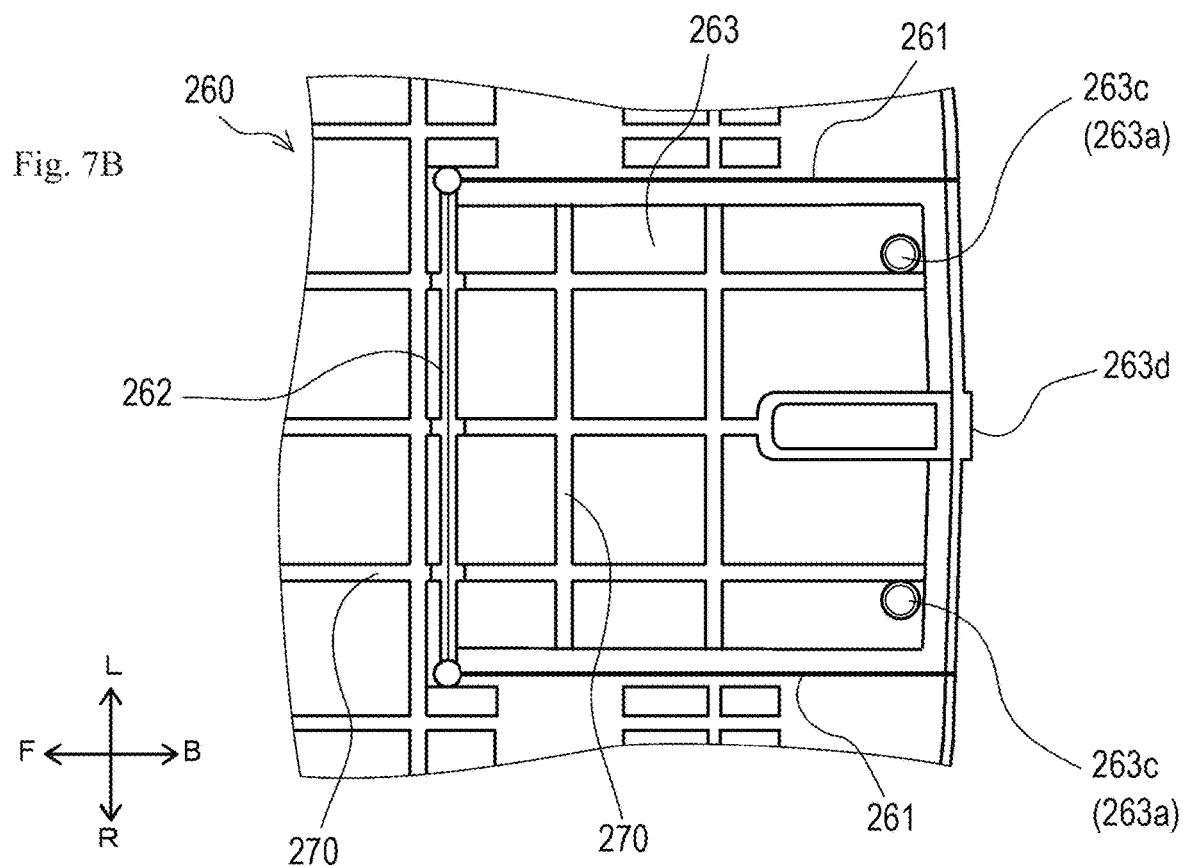
FIG. 7B is a bottom view of the opening/closing portion.

Each slit 261 shown in FIGS. 6, 7A, and 7B is a cut in the upper wall 260 so as to extend from a rear end of the upper wall 260 to a middle portion in the front-rear direction. A pair of the slits 261 is provided at a space in the left-right direction. A circular hole in a plan view is provided at a front end of each slit 261.

The groove 262 shown in FIGS. 6, 7B, 8A, and 8B facilitates transformation of the upper wall 260 due to opening and closing of the opening/closing portion 263 described later. As shown in FIGS. 6 and 7B, the groove 262 is provided on a lower surface of the upper wall 260 so as to extend in the left-right direction. The groove 262 is between the front ends of the pair of slits 261. As shown in FIG. 8A, the groove 262 has a substantially V-shape.

The opening/closing portion 263 shown in FIGS. 6 to 8B can be opened in an open state in which the injection port 4a is exposed and can be closed in a closed state in which the injection port 4a is covered. The opening/closing portion 263 includes a portion between the pair of slits 261 in the upper wall 260. The opening/closing portion 263 has a substantially rectangular shape in a plan view. As shown in FIGS. 8A and 8B, the opening/closing portion 263 is provided at a position adjacent to the front wall 121 of the seat base 120. Further, as shown in FIG. 7A, the opening/closing portion 263 is disposed at a position overlapping substantially the entire injection port 4a of the transmission case 4 in a plan view.

As shown in FIGS. 8A and 8B, the opening/closing portion 263 is rotatably connected to another portion of the upper wall 260 through the portion between the front ends of the pair of slits 261 (a portion thinned by formation of the groove 262). By bending the portion where the groove 262 is located, the opening/closing portion 263 rotates with respect to the other portion with the portion as a fulcrum. The opening/closing portion 263 includes the protrusion 263a and a handle 263d.

The protrusion 263a shown in FIGS. 6 to 8B is inserted into the hole 121c of the fixing portion 121b provided on the seat base 120 in the closed state. The protrusion 263a protrudes downward from a lower surface of the opening/closing portion 263. The protrusion 263a is provided at a rear end of the opening/closing portion 263 as shown in FIG. 7B. A pair of the protrusions 263a is located at both ends in the left-right direction of the opening/closing portion 263. Each of the protrusions 263a includes a shaft 263b and a tip 263c.

The shaft 263b shown in FIGS. 6 and 8A is a portion protruding from the lower surface of the opening/closing portion 263. The shaft 263b has a substantially cylindrical shape with an axial direction facing in the up-down direction. An outer diameter of the shaft 263b is smaller than an inner diameter of the hole 121c.

The tip 263c is a portion provided at a tip of the shaft 263b. The tip 263c has a shape having an enlarged diameter with respect to the shaft 263b. An outer diameter of the tip 263c is larger than the inner diameter of the hole 121c.

The handle 263d shown in FIGS. 5, 7A, 8A, and 8B protrudes upward from an upper surface of the opening/closing portion 263. The handle 263d extends from the rear end at the central portion in the left-right direction of the opening/closing portion 263 to the middle portion in the front-rear direction. The handle 263d has a substantially rectangular parallelepiped shape that is long in the front-rear direction. Further, the handle 263d has a hollow shape. By gripping the handle 263d, an operator can easily open and close the opening/closing portion 263. The handle 263d, having a hollow shape, can be easily transformed when gripped and can be easily gripped.

The rib 270 shown in FIGS. 6 and 7B protrudes from a lower surface of the floor mat 200 (surface facing the steps 110 and the transmission case 4). The rib 270 has a grid pattern over substantially the entire floor mat 200. In the present preferred embodiment, the rib 270 is provided on substantially the entire floor mat 200 except for front portions of the left section 210 and the right section 220. The rib 270 improves strength of the floor mat 200. In particular, in the floor mat 200, the strength of the front central section 230 and the rear central section 240, which are located between the pair of steps 110 and are not placed on the steps 110, can be improved.

Hereinafter, opening/closing operations of the opening/closing portion 263 of the floor mat 200 will be described with reference to FIGS. 8A and 8B. First, an operation of shifting the opening/closing portion 263 in the closed state to the open state will be described.

FIG. 8A shows the opening/closing portion 263 in the closed state. In the closed state, the opening/closing portion 263 closes the opening located between the pair of slits 261 so as to cover the injection port 4a of the transmission case 4 from above. In the closed state, the upper surface of the opening/closing portion 263 is substantially flush with an upper surface of the other portion of the upper wall 260.

Further, in the closed state, the pair of protrusions 263a of the opening/closing portion 263 is inserted into the pair of holes 121c of the fixing portion 121b provided in the seat base 120. Further, in this state, the tip 263c of each protrusion 263a prevents each protrusion 263a from coming off. Thus, the opening/closing portion 263 can be fixed, and the opening/closing portion 263 can be prevented from opening unintentionally. This makes it possible to prevent the floor mat 200 from degrading appearance and from being clogged with dust or the like in a gap. By fixing the opening/closing portion 263, the transmission case 4 can be covered by the floor mat 200 without a gap, and noise generated in the transmission case 4 can be prevented from being transmitted to the driver's seat 100. As a result, noise can be reduced.

The operator can shift the opening/closing portion 263 to the open state as shown in FIG. 8B by rotating the opening/closing portion 263 to rise with the front end (a portion where the groove 262 is provided) of the opening/closing portion 263 as a fulcrum. When the opening/closing portion 263 is shifted to the open state, the operator grips the handle 263d and rotates the opening/closing portion 263 to rise. At this time, the protrusions 263a inserted into the holes 121c come off, and thus the opening/closing portion 263 is released from the fixed state.

In the open state, the opening formed between the pair of slits 261 of the upper wall 260 is opened, and the injection port 4a of the transmission case 4 is exposed. In this state, the operator can inject the transmission oil through the injection port 4a.

Next, an operation of shifting the opening/closing portion 263 in the open state to the closed state will be described.

Contrary to the operation of shifting the opening/closing portion 263 to the open state, the operator can shift the opening/closing portion 263 to the closed state shown in FIG. 8A by rotating the opening/closing portion 263 to lie down with the front end of the opening/closing portion 263 (part between the front ends of the pair of slits 261) as a fulcrum. When the opening/closing portion 263 is shifted to the closed state, the operator grips the handle 263d and rotates the opening/closing portion 263 to tilt toward the fixing portion 121b. At this time, the protrusions 263a are inserted into the holes 121c, and thus the opening/closing portion 263 is fixed.

As described above, the tractor 1 (work vehicle) according to the present preferred embodiment includes the transmission case 4 (mission case) provided with the injection port 4a (opening) that allows injection of transmission oil, the floor mat 200 located above the transmission case 4 (mission case) and near the driver's seat 100, the floor mat 200 having the opening/closing portion 263 configured to be opened in the open state in which the injection port 4a (opening) is exposed and configured to be closed in the closed state in which the injection port 4a (opening) is covered, and the fixing portion 121b configured to fix the opening/closing portion 263 in the closed state, in which the opening/closing portion 263 includes the protrusion 263a protruding in a predetermined direction, and the fixing portion 121b includes the hole 121c configured to fix the opening/closing portion 263 when the protrusion 263a is inserted into the hole 121c.

This configuration allows the opening/closing portion 263 to be fixed in the closed state by inserting the protrusions 263a into the holes 121c, and can prevent the opening/closing portion 263 from opening unintentionally. This makes it possible to prevent the floor mat 200 from degrading appearance and from being clogged with dust or the like in a gap. Further, noise can be reduced. In addition, by inserting and removing the protrusions 263a into and from the holes 121c, the opening/closing portion 263 can be easily fixed and released from the fixed state, and the opening/closing portion 263 can be easily opened and closed.

The opening/closing portion 263 is between the pair of slits 261 extending from a first end in the front-rear direction of the floor mat 200 to a second end in the front-rear direction of the floor mat 200.

This configuration allows the opening/closing portion 263 to be opened and closed in the front-rear direction. As a result, in the open state, the opening/closing portion 263 is not located on the left and right sides of the injection port 4a (opening) of the transmission case 4 (mission case), and thus the transmission oil can be easily injected from either the left or right side. Further, by providing the floor mat 200 with the pair of slits 261, the opening/closing portion 263 can be formed, and the configuration of the opening/closing portion 263 can be simplified.

Further, the floor mat 200 includes the groove 262 facilitating transformation of the floor mat 200 due to opening and closing of the opening/closing portion 263.

This configuration facilitates opening and closing of the opening/closing portion 263. That is, by forming the groove 262, a portion of the floor mat 200 (upper wall 260) is thinned and easily transformed, and the opening/closing portion 263 can be easily opened and closed.

The tractor 1 (work vehicle) includes the seat base 120 in which the seat 130 is installed near the driver's seat 100, and the opening/closing portion 263 is provided at a position adjacent to the seat base 120 in front of the seat base 120.

This configuration can more effectively prevent the opening/closing portion 263 from opening unintentionally. That is, the opening/closing portion 263, provided at a position unlikely to contact the feet of the operator sitting in the driver's seat 100, can be more effectively prevented from opening unintentionally.

Further, the fixing portion 121b is provided on the seat base 120.

In this configuration, the opening/closing portion 263 can be fixed in the closed state by using the seat base 120.

Further, the opening/closing portion 263 includes the handle 263d protruding upward from the upper surface of the opening/closing portion 263.

In this configuration, the opening/closing portion 263 can be easily opened and closed by gripping the handle 263d.

The tractor 1 according to the present preferred embodiment is one aspect of the work vehicle of the disclosure.

Further, the transmission case 4 according to the present preferred embodiment is one aspect of the mission case of the disclosure.

Further, the injection port 4a according to the present preferred embodiment is one aspect of the opening of the disclosure.

Although the first preferred embodiment of the disclosure has been described above, the present disclosure is not limited to the above configuration, and various modifications can be made within the scope of the claims.

For example, the tractor 1 is not limited to the above configuration, and may be a tractor 1A according to a second preferred embodiment of the present disclosure described below.

Hereinafter, the tractor 1A according to the second preferred embodiment will be described with reference to FIGS. 9 and 10. In the following, differences from the tractor 1 according to the first preferred embodiment will be mainly described. The points common to the tractor 1 according to the first preferred embodiment are designated by the same reference numerals as those in the first preferred embodiment, and the description thereof will be omitted as appropriate.

Figure 9:
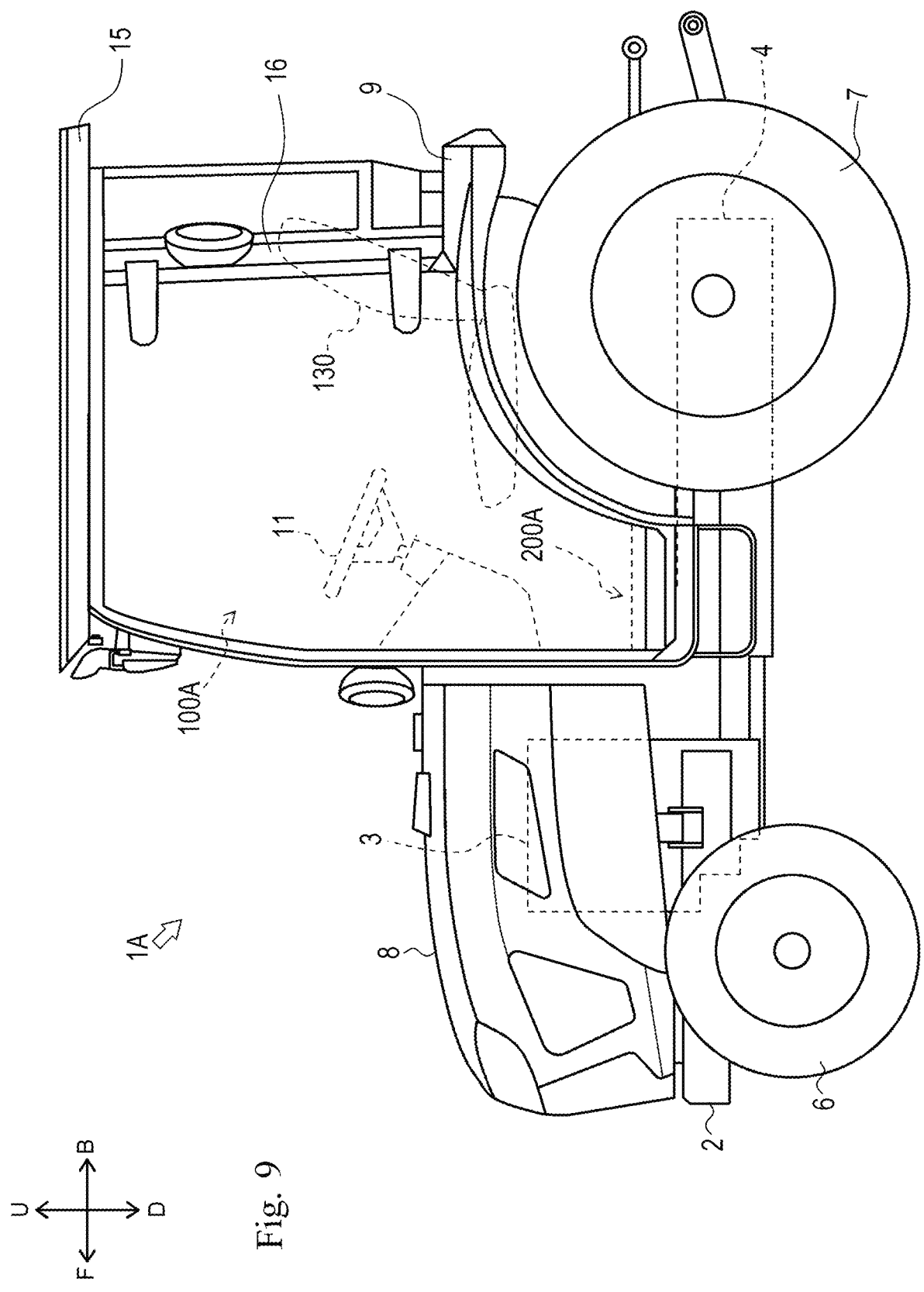
FIG. 9 is a side view of an overall configuration of a tractor according to a second preferred embodiment of the present invention.

The tractor 1A shown in FIG. 9 is different from the tractor 1 according to the first preferred embodiment in that a cabin is provided and a driver's seat 100A is located inside the cabin. The driver's seat 100A is partitioned by a step 110A configuring a floor of the cabin, a ceiling 15 configuring the ceiling of the cabin, a support 16 supporting the ceiling 15, and doors and windows attached to the support 16.

Figure 10:
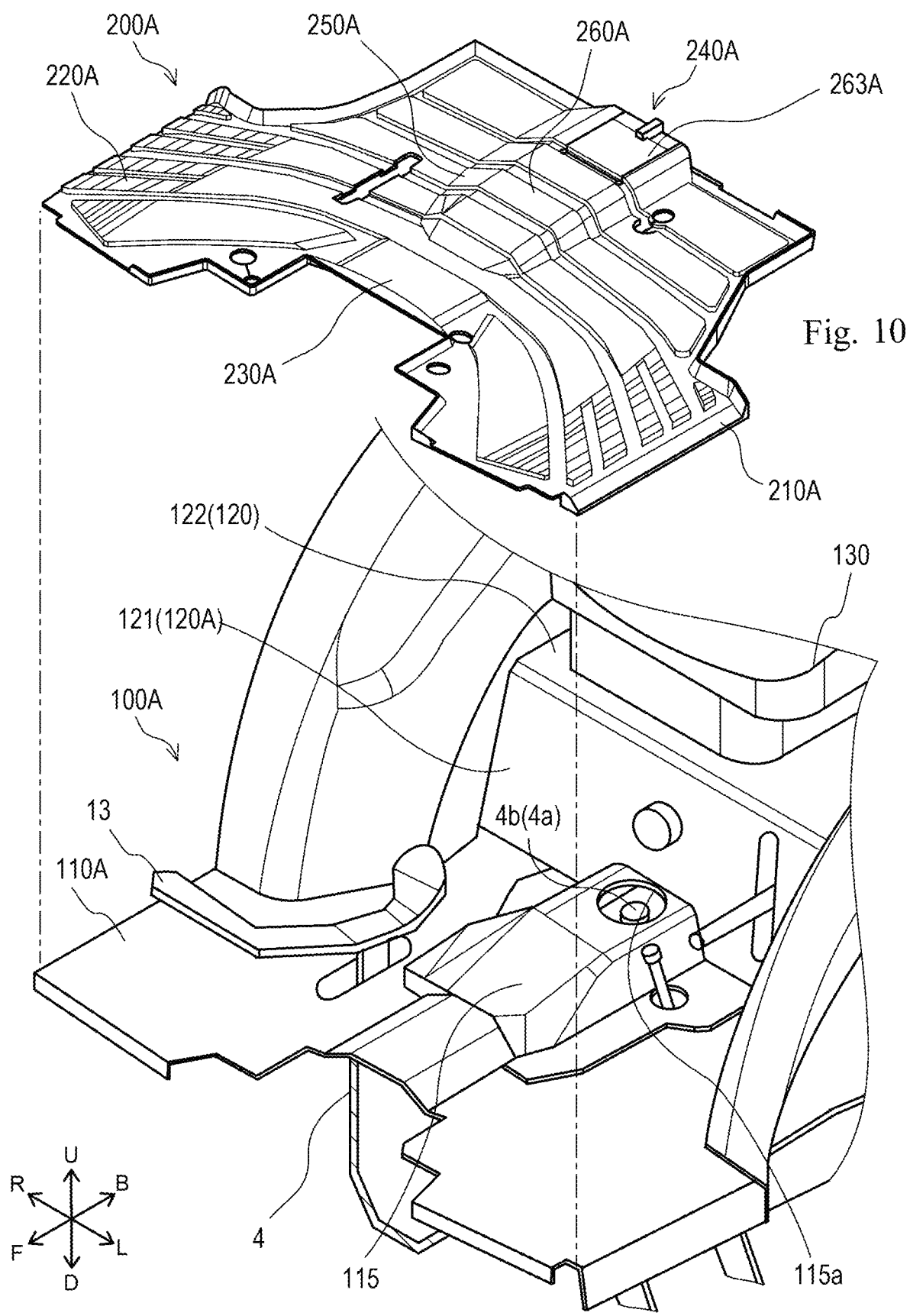
FIG. 10 is an exploded perspective view of a driver's seat of the tractor according to the second preferred embodiment of the present invention.
Figure 11:
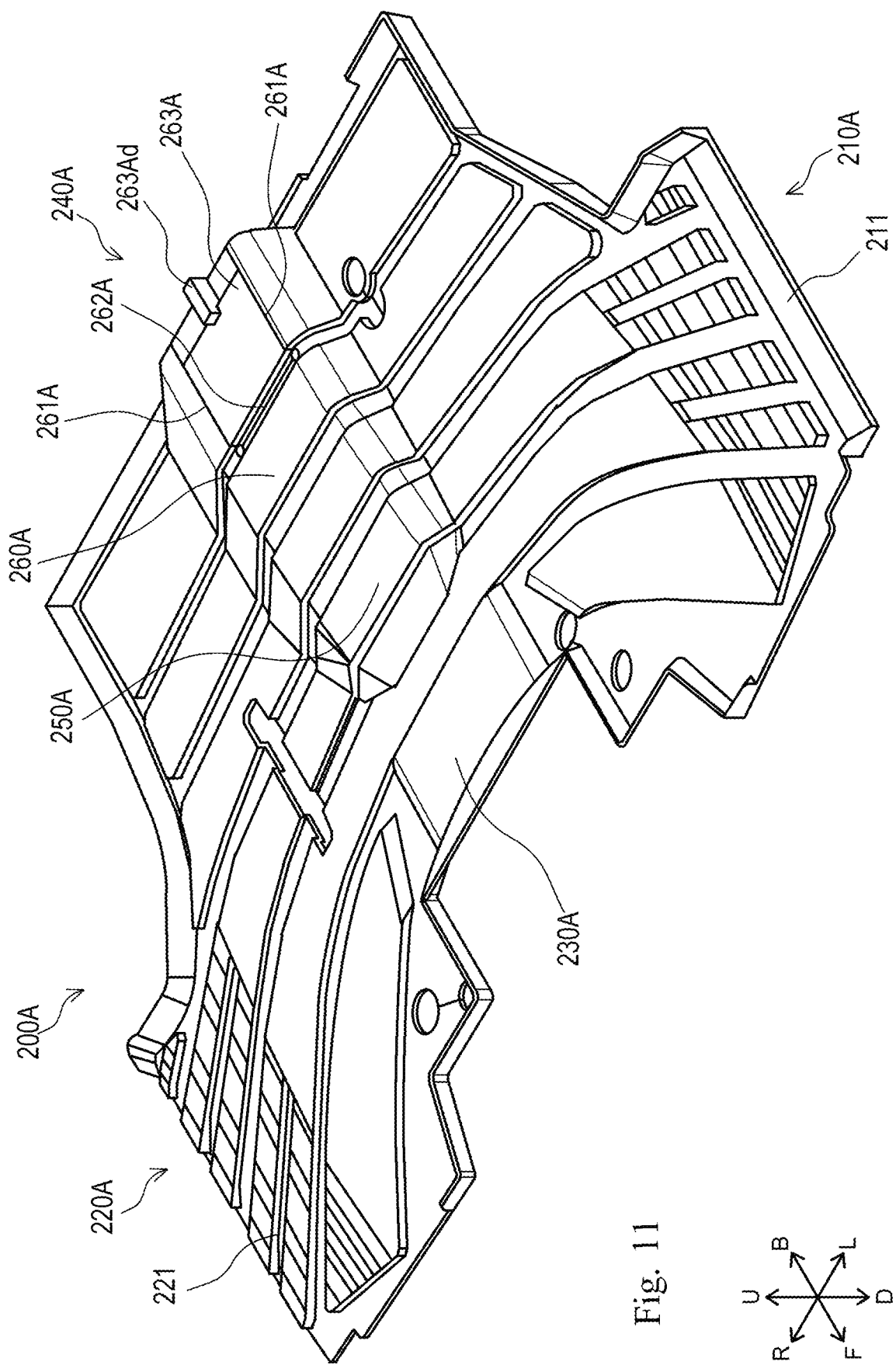
FIG. 11 is a perspective view of a floor mat according to the second preferred embodiment of the present invention.

The step 110A shown in FIG. 10 differs from the step 110 according to the first preferred embodiment in that the step 110A includes a cover 115 that covers the upper portion of the transmission case 4. Further, the step 110A is different from the steps 110 according to the first preferred embodiment in that the positioning holes 112 are not formed. Further, an appropriate sound absorbing material (not shown) is provided above a portion of the step 110A other than the cover 115.

The cover 115 shown in FIG. 10 covers the upper portion of the transmission case 4 in the step 110A. The cover 115 has a shape capable of accepting the upper portion of the transmission case 4. Specifically, the cover 115 has a substantially box shape that opens downward and in the front-rear direction. Further, the rear portion of the cover 115 protrudes upward from the front portion. The cover 115 is disposed at a position adjacent to the front wall 121 of the seat base 120. The cover 115 includes a hole 115a.

The hole 115a passes through the cover 115 in the up-down direction. The hole 115a has a substantially circular shape in a plan view. The hole 115a is located at a position overlapping the injection port 4a of the transmission case 4 in a plan view. As shown in FIG. 10, an inner diameter of the hole 115a is larger than an inner diameter of the injection port 4a. The operator can inject the transmission oil into the injection port 4a through the hole 115a.

Further, the seat base 120A shown in FIG. 10 is different from the seat base 120 according to the first preferred embodiment in that the holes 121c are not provided in the front wall 121.

Hereinafter, a floor mat 200A according to the second preferred embodiment will be described with reference to FIGS. 11 to 14B. In the following, differences from the floor mat 200 according to the first preferred embodiment will be mainly described. Further, the points common to the floor mat 200 according to the first preferred embodiment are designated by the same reference numerals as those in the first preferred embodiment, and the description thereof will be omitted as appropriate.

The floor mat 200A differs from the floor mat 200 according to the first preferred embodiment mainly in a configuration of an opening/closing portion 263A described later. The floor mat 200A includes a left section 210A, a right section 220A, a front central section 230A, a rear central section 240A, and a rib 270A.

The left section 210A and the right section 220A cover left and right portions of the step 110A. The left section 210A and the right section 220A are different from the left section 210 and the right section 220 according to the first preferred embodiment in that the positioning protrusions 212 and 222 are not provided.

The front central section 230A covers a front portion of the cover 115. The front central section 230A has a substantially plate shape that is substantially flat.

The rear central section 240A covers a rear portion of the cover 115. The rear central section 240A has a shape capable of accepting the rear portion of the cover 115. Specifically, the rear central section 240A has a substantially box shape that opens downward and rearward. The rear central section 240A includes a side wall 250A and an upper wall 260A.

The side wall 250A has a vertical dimension that is smaller than a vertical dimension of the side wall 250 according to the first preferred embodiment. That is, the rear central section 240A is lower in height than the rear central section 240 according to the first preferred embodiment.

The upper wall 260A shown in FIGS. 12 to 14B is located on an upper surface of the rear portion of the cover 115. The upper wall 260A includes slits 261A, a groove 262A, and the opening/closing portion 263A.

Similarly to the slits 261 according to the first preferred embodiment, the slits 261A are a pair of cuts extending from a rear end of the upper wall 260A to a middle portion in the front-rear direction.

Figure 14A:
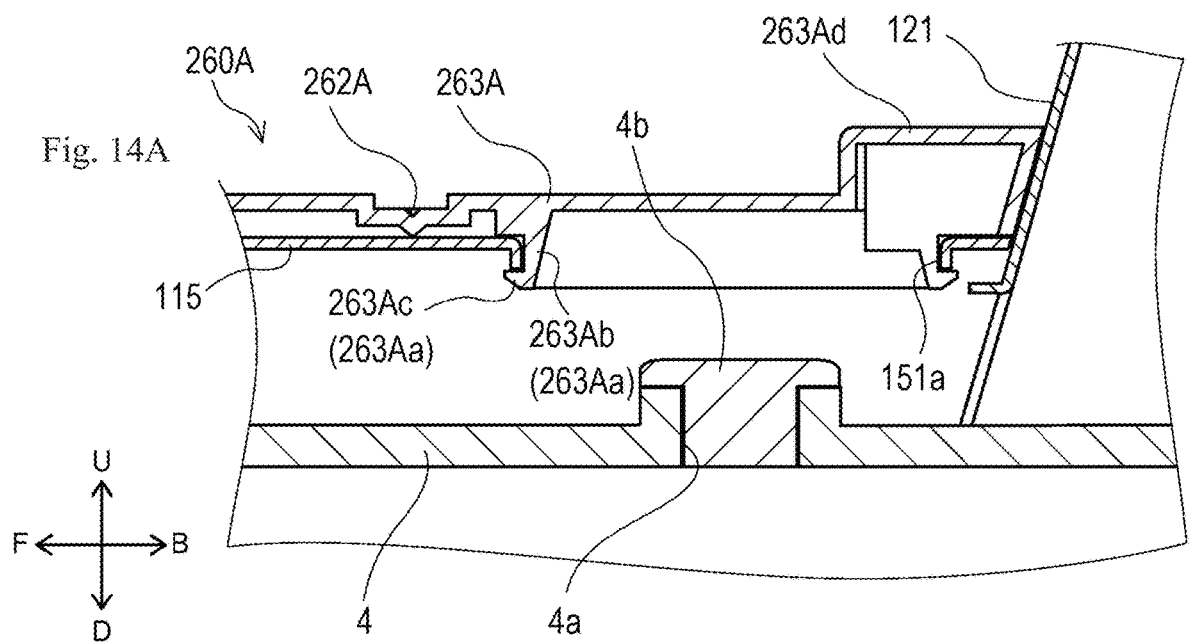
FIG. 14A is a cross-sectional view of the opening/closing portion, in the closed state, taken along line X2-X2 in FIG. 13A.

The groove 262A shown in FIGS. 11, 13A, 14A, and 14B facilitates transformation of the upper wall 260A due to opening and closing of the opening/closing portion 263A. The groove 262A is provided on the upper surface of the upper wall 260A so as to extend in the left-right direction. The groove 262A is between front ends of the pair of slits 261A. As shown in FIG. 14A, the groove 262A has a substantially V-shape.

The opening/closing portion 263A shown in FIGS. 12 to 14B is between the pair of slits 261A in the upper wall 260A. As shown in FIG. 13A, the opening/closing portion 263A is at a position overlapping substantially the entire injection port 4a of the transmission case 4 and the hole 115a of the cover 115 in a plan view. The opening/closing portion 263A includes a protrusion 263Aa and a handle 263Ad.

The protrusion 263Aa shown in FIGS. 12, 13B, 14A, and 14B is inserted into the hole 115a in the cover 115 in the closed state. The protrusion 263Aa protrudes downward from a lower surface of the opening/closing portion 263A. The protrusion 263Aa is provided at a center of the opening/closing portion 263A in the up-down and left-right directions. The protrusion 263Aa includes a shaft 263Ab and a tip 263Ac.

The shaft 263Ab protrudes from the lower surface of the opening/closing portion 263A. The shaft 263Ab has a substantially cylindrical shape with an axial direction facing in the up-down direction. An outer diameter of the shaft portion 263Ab is smaller than the inner diameter of the hole 115a.

The tip 263Ac is provided at a tip of the shaft 263Ab. The tip 263Ac has a shape having an enlarged diameter with respect to the shaft 263Ab. An outer diameter of the tip 263Ac is larger than the inner diameter of the hole 115a.

The handle 263Ad shown in FIGS. 11, 13A, 14A, and 14B protrudes upward from the upper surface of the opening/closing portion 263A, similarly to the handle 263d according to the first preferred embodiment.

Figure 12:
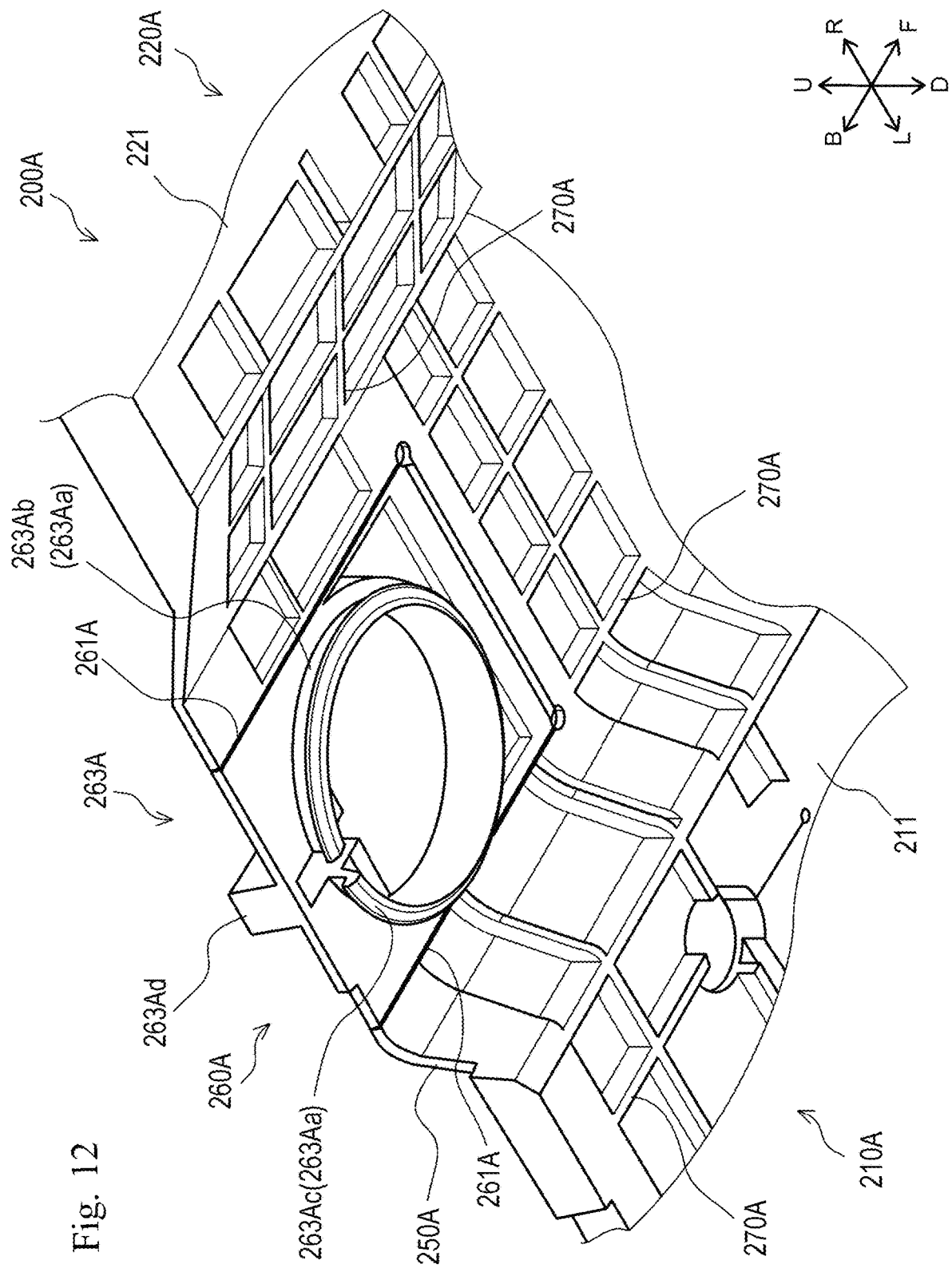
FIG. 12 is a perspective view of an opening/closing portion when viewed from below.
Figure 13A:
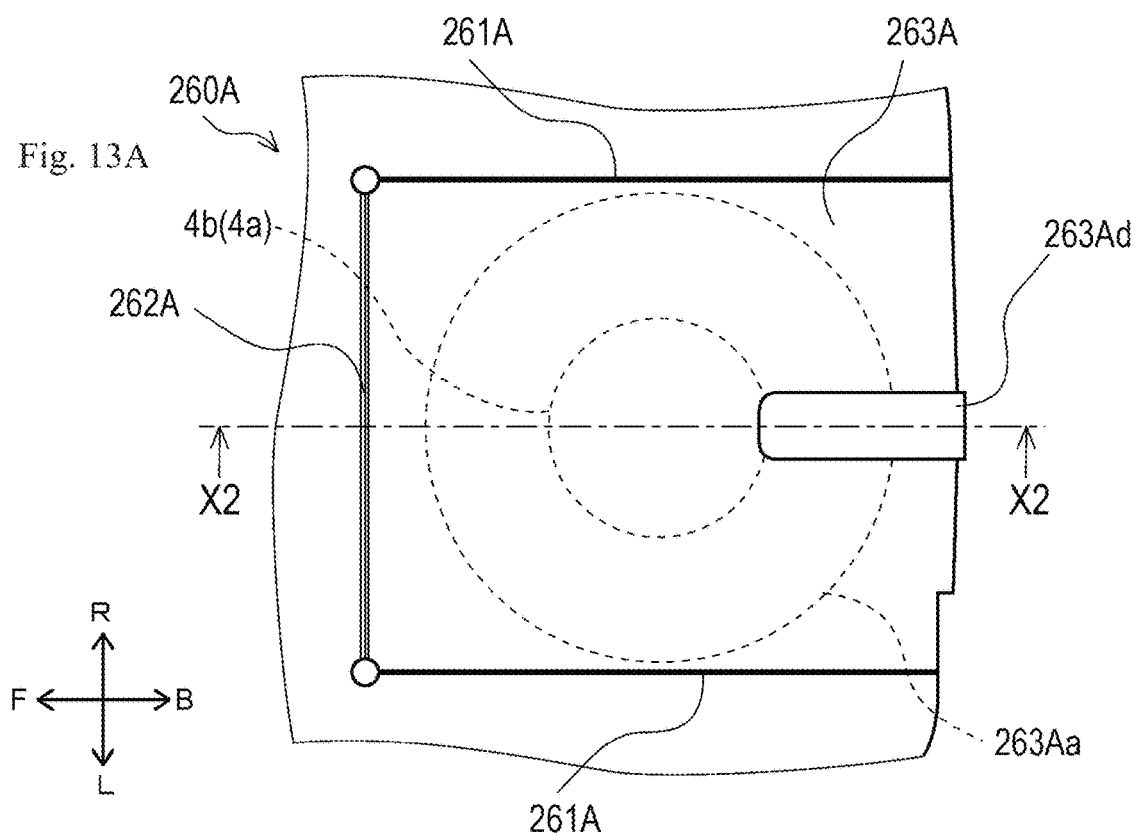
FIG. 13A is a plan view of the opening/closing portion.
Figure 13B:
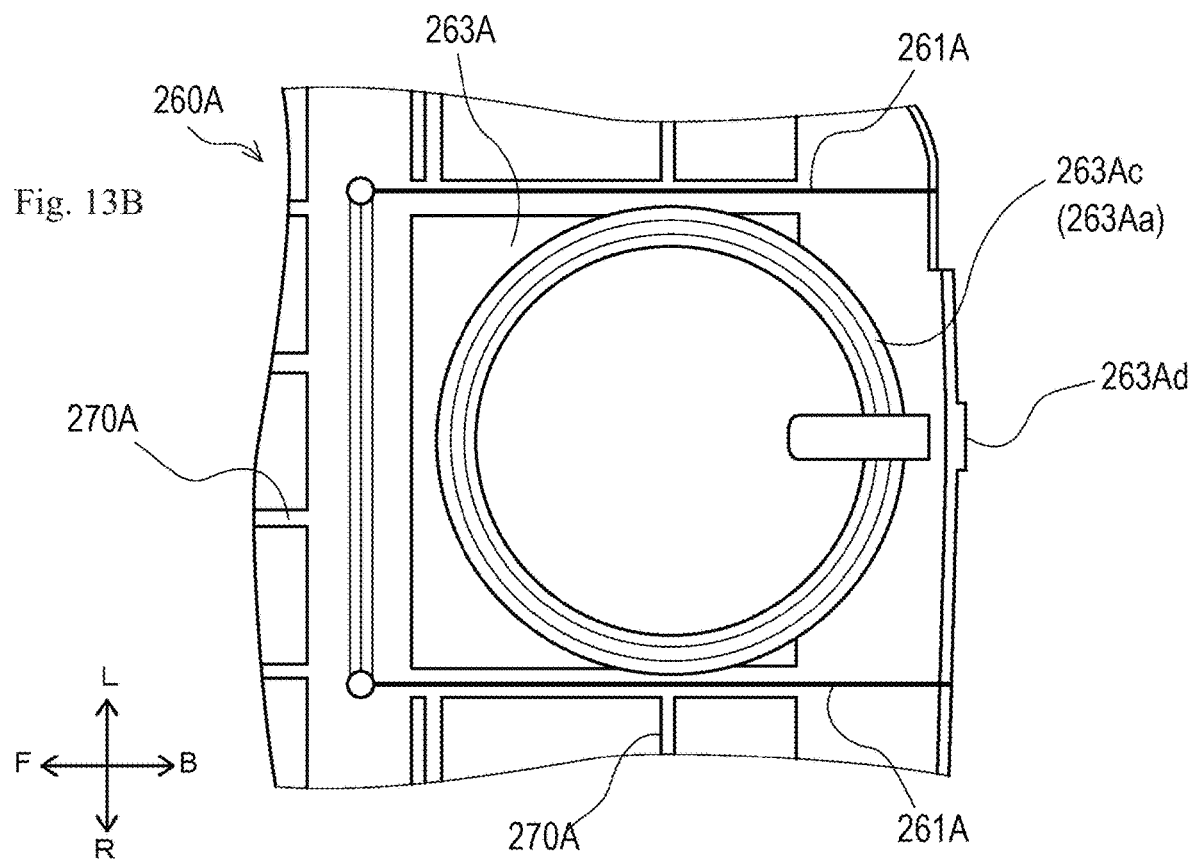
FIG. 13B is a bottom view of the opening/closing portion.

The rib 270A shown in FIGS. 12 and 13B protrudes from a lower surface of the floor mat 200A (surface facing the step 110A, the transmission case 4, and the cover 115), similarly to the rib 270 according to the first preferred embodiment. The rib 270A has a grid pattern over substantially the entire floor mat 200A.

Hereinafter, opening/closing operations of the opening/closing portion 263A of the floor mat 200A will be described with reference to FIGS. 14A and 14B. First, an operation of shifting the opening/closing portion 263A in the closed state to the open state will be described.

FIG. 14A shows the opening/closing portion 263A in the closed state. In the closed state, the opening/closing portion 263A closes an opening between the pair of slits 261 so as to cover the injection port 4a of the transmission case 4 and the hole 115a of the cover 115 from above. In the closed state, the upper surface of the opening/closing portion 263A is substantially flush with an upper surface of the other portion of the upper wall 260A.

Further, in the closed state, the protrusion 263Aa of the opening/closing portion 263A is inserted into the hole 115a of the cover 115. Further, in this state, the tip 263Ac of each protrusion 263Aa prevents each protrusion 263Aa from coming off.

Figure 14B:
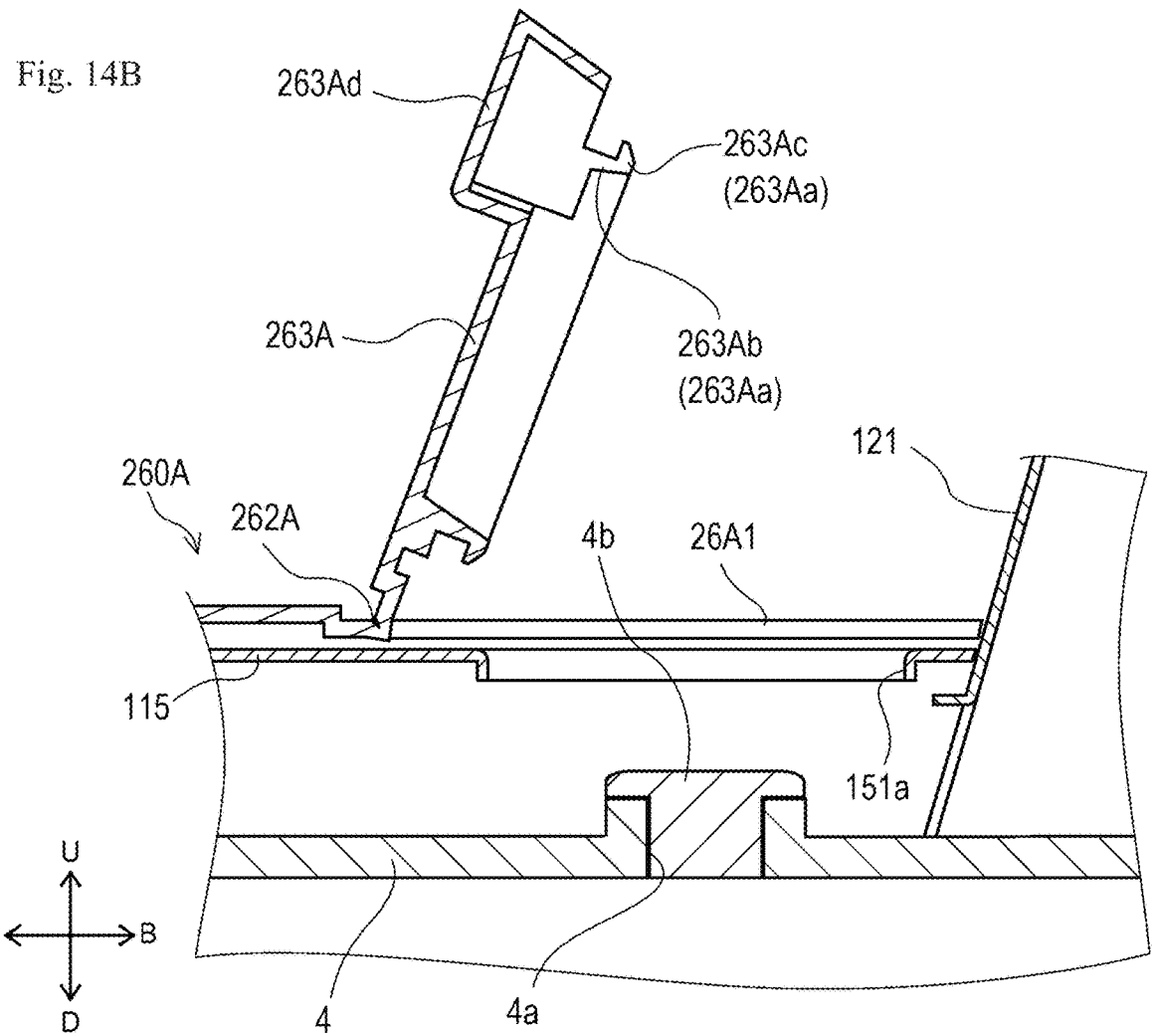
FIG. 14B is a side sectional view of the opening/closing portion in the open state.

The operator can shift the opening/closing portion 263A to the open state as shown in FIG. 14B by rotating the opening/closing portion 263A to rise with the front end (a portion where the groove 262A is located) of the opening/closing portion 263A as a fulcrum. When the opening/closing portion 263A is shifted to the open state, the operator grips the handle 263Ad and rotates the opening/closing portion 263A to rise. At this time, the protrusion 263Aa inserted into the hole 115a comes off, and thus the opening/closing portion 263A is released from the fixed state.

In the open state, the injection port 4a of the transmission case 4 is exposed through the hole 115a of the cover 115. In this state, the operator can inject the transmission oil through the hole 115a and the injection port 4a.

Next, an operation of shifting the opening/closing portion 263A in the open state to the closed state will be described.

Contrary to the operation of shifting the opening/closing portion 263A to the open state, the operator can shift the opening/closing portion 263A to the closed state shown in FIG. 14A by rotating the opening/closing portion 263A to lie down with the front end of the opening/closing portion 263A (part between the front ends of the pair of slits 261A) as a fulcrum. When the opening/closing portion 263A is shifted to the closed state, the operator grips the handle 263Ad and rotates the opening/closing portion 263A to tilt toward the cover 115. At this time, the protrusion 263Aa is inserted into the hole 115a, and thus the opening/closing portion 263A is fixed.

The floor mat 200A as described above has substantially the same effect as the floor mat 200 according to the first preferred embodiment.

As described above, the hole 115a according to the second preferred embodiment allows injection of the mission oil therethrough.

In this configuration, the opening/closing portion 263A can be fixed in the closed state by utilizing the hole 115a used to inject the transmission oil.

The cover 115 according to the present preferred embodiment is one aspect of the fixing portion of the present disclosure.

Further, the floor mat 200A is not limited to the above configuration, and may be a floor mat 200B according to a third preferred embodiment of the present disclosure described below.

Hereinafter, the floor mat 200B according to the third preferred embodiment will be described with reference to FIGS. 15A to 15C. In the following, differences from the floor mat 200 according to the first preferred embodiment will be mainly described. Further, the points common to the floor mat 200 according to the first preferred embodiment are designated by the same reference numerals as those in the first preferred embodiment, and the description thereof will be omitted as appropriate.

The floor mat 200B differs from the floor mat 200 according to the first preferred embodiment mainly in a configuration of an upper wall 260B. Specifically, the floor mat 200B is different from the floor mat 200 according to the first preferred embodiment in a shape of a handle 263Bd provided on the upper wall 260B and in that a holder 263f described later is provided on the upper wall 260B.

Figure 15A:
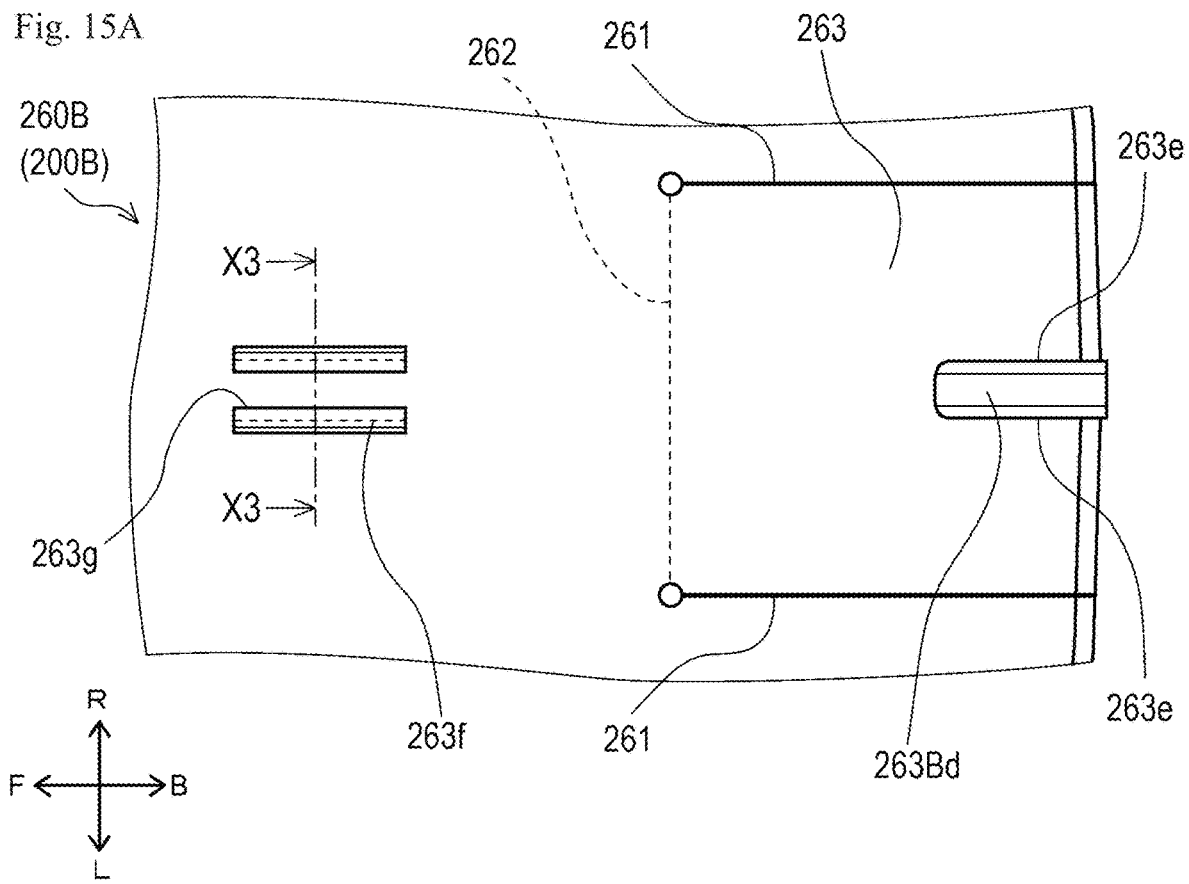
FIG. 15A is a plan view of a floor mat according to a third preferred embodiment of the present invention.
Figure 15B:
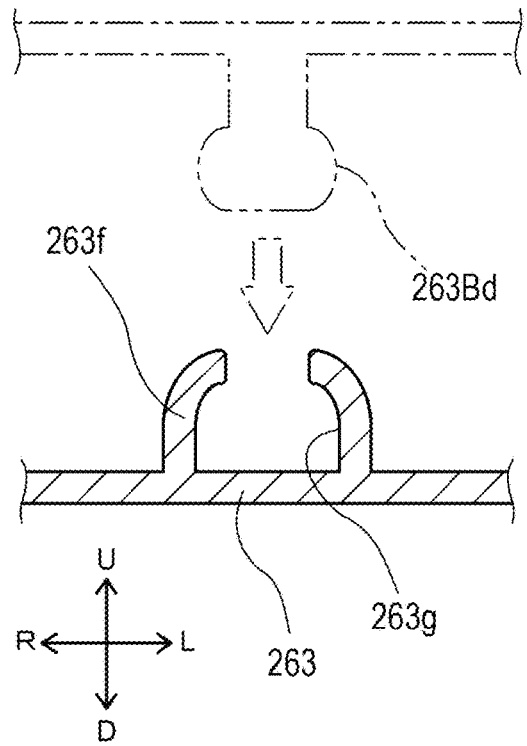
FIG. 15B is a cross-sectional view taken along line X3-X3 in FIG. 15A.

The handle 263Bd shown in FIGS. 15A and 15B is different from the handle 263d according to the first preferred embodiment in that a protrusion 263e is provided at an upper end (tip in a protruding direction). The protrusion 263e protrudes from the upper end of the handle 263Bd to both sides in the left-right direction. As shown in FIG. 15B, the protrusion 263e includes a curved surface at a tip in the protruding direction in a front view. The protrusion 263e extends over the entire front-rear direction of the handle 263Bd.

The holder 263f can hold the opening/closing portion 263 by receiving the handle 263Bd in the open state of the opening/closing portion 263. The holder 263f protrudes upward from an upper surface of the upper wall 260B. The holder 263f is provided in front of the opening/closing portion 263 (on a side opposite to the handle 263Bd across the groove 262 in a plan view).

A receiver 263g is an opening capable of receiving the handle 263Bd. The receiver 263g opens upward and in the front-rear direction at the holder 263f. As shown in FIGS. 15B and 15C, the receiver 263g has a shape corresponding to the protrusion 263e of the handle 263Bd in a front view.

Figure 15C:
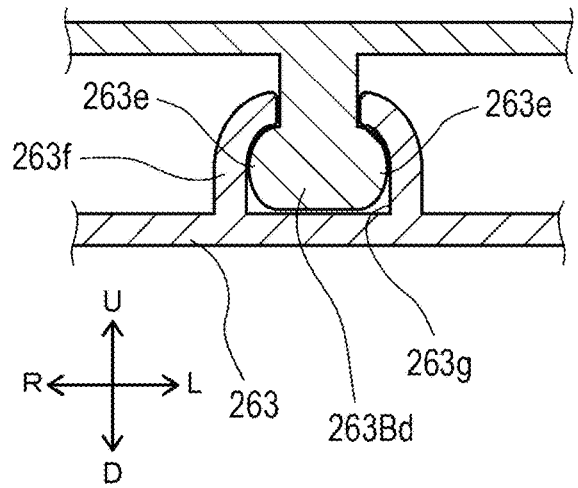
FIG. 15C is a side sectional view of a holder having received a handle.

The holder 263f as described above allows the receiver 263g to receive the protrusion 263e of the handle 263Bd as shown in FIG. 15C. In this state, the receiver 263g and the protrusion 263e are engaged with each other to restrict the rotation of the opening/closing portion 263 into the closed state. That is, the holder 263f can hold the opening/closing portion 263 in the open state. As a result, the operator does not have to hold the opening/closing portion 263, and can easily inject the transmission oil into the injection port 4a.

As described above, the floor mat 200B according to the third preferred embodiment includes the holder 263f configured to hold the opening/closing portion 263 in the open state.

This configuration can maintain the opening/closing portion 263 in the open state and facilitates injection of the transmission oil through the injection port 4a.

In addition, the opening/closing portion 263 includes the handle 263Bd protruding upward from the upper surface of the opening/closing portion 263, and the holder 263f includes the receiver 263g configured to hold the opening/closing portion 263 by receiving the handle 263Bd.

In this configuration, the opening/closing portion 263 can be held in the open state by using the handle 263Bd. This can simplify the configuration of the floor mat 200B.

Further, the floor mat 200B is not limited to the above configuration, and may be a floor mat 200C according to a fourth preferred embodiment of the present disclosure described below.

Hereinafter, the floor mat 200C according to the fourth preferred embodiment will be described with reference to FIGS. 16A to 16C. The floor mat 200C differs from the floor mat 200B according to the third preferred embodiment mainly in a configuration of a holder 263h provided on an upper wall 260C. In the following, differences from the floor mat 200B according to the third preferred embodiment will be mainly described. Further, the points common to the floor mat 200B according to the third preferred embodiment are designated by the same reference numerals as those in the third preferred embodiment, and the description thereof will be omitted as appropriate.

The holder 263h shown in FIGS. 16A and 16B has a frame shape surrounding an opening (receiver 263i described later) that passes through the upper wall 260C in the thickness direction. The holder 263h has a substantially rectangular shape that is long in the front-rear direction in a plan view. The holder 263h is formed by increasing a thickness of (thickening) a portion of the upper wall 260C. The holder 263h includes a receiver 263i and a film 263j.

The receiver 263i is different from the receiver 263g according to the third preferred embodiment in that the receiver 263i is an opening that passes through the upper wall 260C in the thickness direction (up-down direction). As shown in FIGS. 16B and 16C, the receiver 263i has a shape capable of being engaged with the handle 263Bd in a front view. Specifically, the receiver 263i is structured such that a left-right dimension is smaller than a left-right dimension of the protrusion 263e of the handle 263Bd and larger than a left-right dimension of the other portion of the handle 263Bd.

Figure 16A:
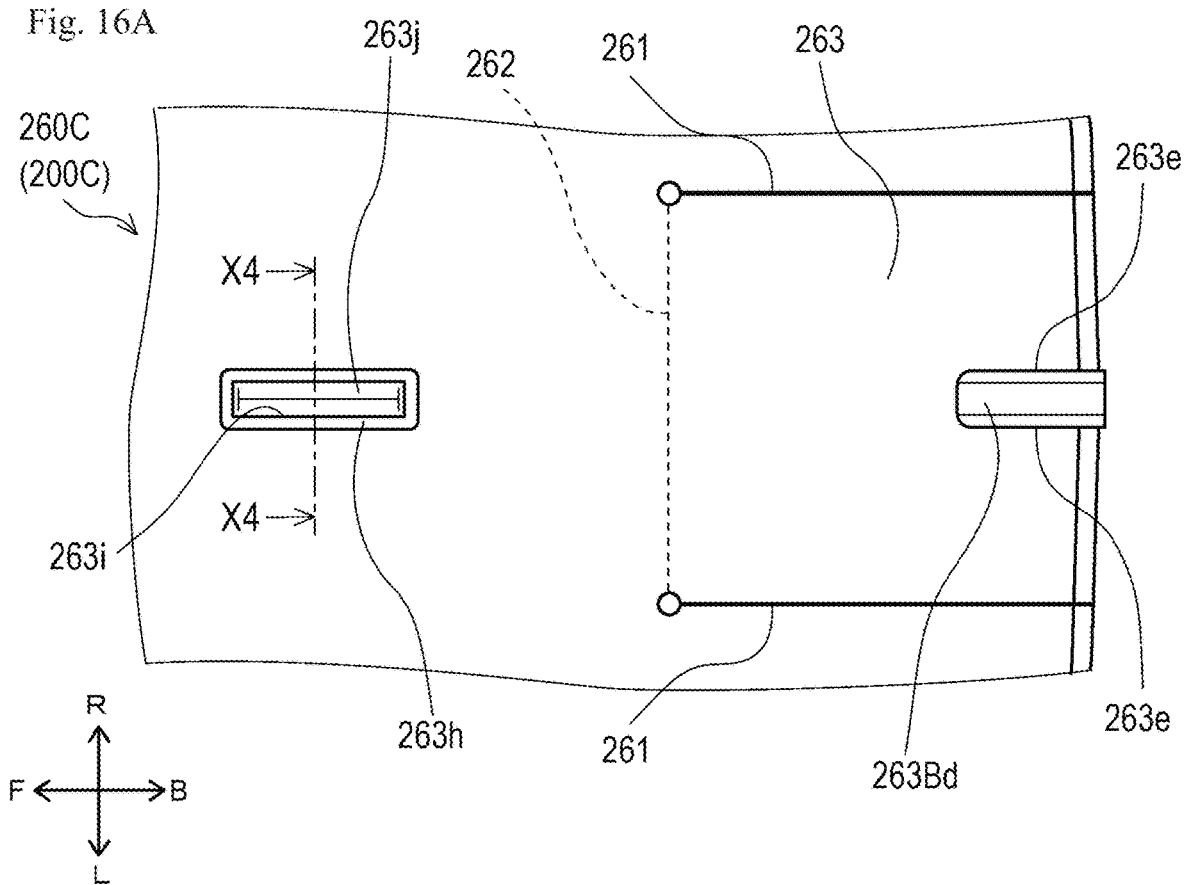
FIG. 16A is a plan view of a floor mat according to a fourth preferred embodiment of the present invention.
Figure 16B:
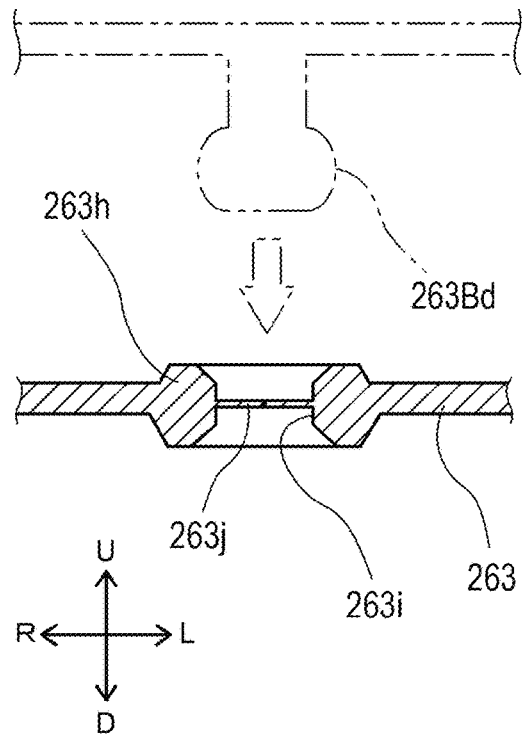
FIG. 16B is a cross-sectional view taken along line X4-X4 in FIG. 16A.

The film 263j shown in FIGS. 16A and 16B covers the receiver 263i. The film 263j has a thin wall shape. The film 263j is provided with an appropriate slit that allows the handle 263Bd to be received. As a result, as shown in FIG. 16B, the receiver 263i can be covered in the closed state of the opening/closing portion 263.

Figure 16C:
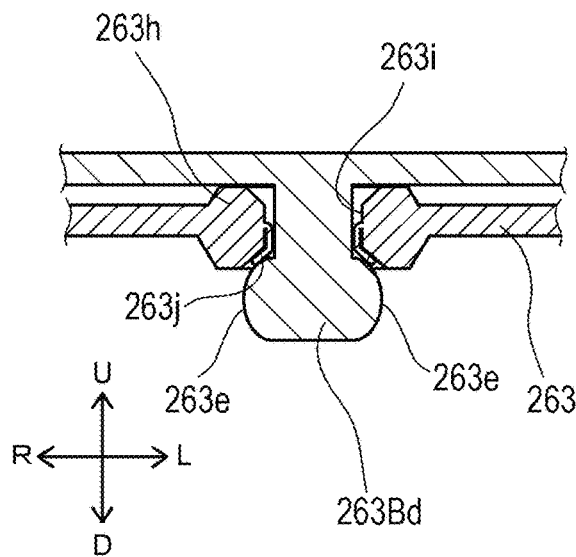
FIG. 16C is a side sectional view of a holder having received the handle.

The holder 263h as described above allows the receiver 263j to receive the protrusion 263e of the handle 263Bd as shown in FIG. 16C. In this state, as in the third preferred embodiment, the receiver 263i and the protrusion 263e are engaged with each other to restrict the rotation of the opening/closing portion 263 into the closed state.

The floor mat 200C as described above has substantially the same effect as the floor mat 200B according to the third preferred embodiment.

Although each of the preferred embodiments of the present disclosure has been described above, the present disclosure is not limited to the above configuration, and various modifications can be made within the scope of the claims.

For example, the fixing portion 121b provided on the seat base 120 shown in the first preferred embodiment and the cover 115 shown in the second preferred embodiment are examples of the fixing portion according to the disclosure, and various configurations capable of fixing the opening/closing portions 263 and 263A in the closed state can be adopted as the fixing portion. For example, in the first preferred embodiment, in the tractor 1 which is a ROPS machine, the opening/closing portion 263 is fixed to the fixing portion 121b provided on the seat base part 120. Alternatively, instead of this configuration, a configuration may be adopted in which the opening/closing portion 263 is fixed to the floor portion covering the transmission case 4 as in the tractor 1A according to the second preferred embodiment as a cabin machine.

Further, in each of the above preferred embodiments, an example in which the slits 261 and 261A extend in the front-rear direction is shown, but the present disclosure is not limited to the preferred embodiments. An appropriate direction can be adopted as the direction of the slits 261 and 261A.

Further, in each of the above preferred embodiments, an example in which the grooves 262 and 262A are provided is shown, but the present disclosure is not limited to the preferred embodiments, and the grooves 262 and 262A do not have to be formed.

Further, the shapes of the protrusions 263a and 263Aa shown in the above preferred embodiments are examples, and are not limited to the above shapes. Various shapes can be adopted as the shapes of the protrusions 263a and 263Aa. For example, the shapes of the tips 263c and 263Ac of the protrusions 263a and 263Aa may be formed into a shape with a sharp distal end so as to be easily inserted into the hole 121c and the hole 115a, respectively.

Further, in each of the above preferred embodiments, an example in which the handles 263d, 263Ad, and 263Bd extend in the front-rear direction is shown, but the present disclosure is not limited to the preferred embodiments. An appropriate direction can be adopted as the direction of the handles 263d, 263Ad, and 263Bd.

Further, in the above preferred embodiments, the tractors 1 and 1A are exemplified as the work vehicle, but the present disclosure is not limited to the preferred embodiments. For example, the work vehicle may be another agricultural vehicle, a construction vehicle, an industrial vehicle, or the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A work vehicle comprising:
a transmission case including an opening to allow injection of transmission oil;
a floor mat located above the transmission case and near a driver's seat, the floor mat including an opening/closing portion to be opened in an open state in which the opening is exposed and to be closed in a closed state in which the opening is covered; and
a fixing portion configured to fix the opening/closing portion in the closed state; wherein
the opening/closing portion includes a protrusion protruding in a predetermined direction; and
the fixing portion includes a hole to fix the opening/closing portion when the protrusion is inserted into the hole.

2. The work vehicle according to claim 1, wherein the opening/closing portion is between a pair of slits extending from a first end in a front-rear direction of the floor mat to a second end in the front-rear direction of the floor mat.

3. The work vehicle according to claim 1, wherein the floor mat includes a groove to facilitate transformation of the floor mat due to opening and closing of the opening/closing portion.

4. The work vehicle according to claim 2, wherein the floor mat includes a groove to facilitate transformation of the floor mat due to opening and closing of the opening/closing portion.

5. The work vehicle according to claim 1, wherein
the driver's seat includes a seat base provided with a seat; and
the opening/closing portion is provided at a position adjacent to the seat base in front of the seat base.

6. The work vehicle according to claim 2, wherein
the driver's seat includes a seat base provided with a seat; and
the opening/closing portion is provided at a position adjacent to the seat base in front of the seat base.

7. The work vehicle according to claim 3, wherein
the driver's seat includes a seat base provided with a seat; and
the opening/closing portion is provided at a position adjacent to the seat base in front of the seat base.

8. The work vehicle according to claim 4, wherein
the driver's seat includes a seat base provided with a seat; and
the opening/closing portion is provided at a position adjacent to the seat base in front of the seat base.

9. The work vehicle according to claim 5, wherein the fixing portion is provided on the seat base.

10. The work vehicle according to claim 6, wherein the fixing portion is provided on the seat base.

11. The work vehicle according to claim 7, wherein the fixing portion is provided on the seat base.

12. The work vehicle according to claim 8, wherein the fixing portion is provided on the seat base.

13. The work vehicle according claim 1, wherein the hole allows injection of the transmission oil therethrough.

14. The work vehicle according claim 2, wherein the hole allows injection of the transmission oil therethrough.

15. The work vehicle according claim 3, wherein the hole allows injection of the transmission oil therethrough.

16. The work vehicle according claim 4, wherein the hole allows injection of the transmission oil therethrough.

17. The work vehicle according claim 5, wherein the hole allows injection of the transmission oil therethrough.

18. The work vehicle according claim 1, wherein the opening/closing portion includes a handle protruding upward from an upper surface of the opening/closing portion.

19. The work vehicle according to claim 1, wherein the floor mat includes a holder to hold the opening/closing portion in the open state.

20. The work vehicle according to claim 19, wherein
the opening/closing portion includes a handle protruding upward from an upper surface of the opening/closing portion; and the holder includes a receiver to hold the opening/closing portion by receiving the handle.

\* \* \* \* \*